(12) United States Patent
Yamamoto et al.

(10) Patent No.: US 9,741,090 B2
(45) Date of Patent: Aug. 22, 2017

(54) GRAPHICS DISPLAY PROCESSING DEVICE, GRAPHICS DISPLAY PROCESSING METHOD, AND VEHICLE EQUIPPED WITH GRAPHICS DISPLAY PROCESSING DEVICE

(71) Applicant: PANASONIC INTELLECTUAL PROPERTY CORPORATION OF AMERICA, Torrance, CA (US)

(72) Inventors: Tetsuji Yamamoto, Osaka (JP); Masahiko Saito, Osaka (JP); Takuya Kondoh, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 162 days.

(21) Appl. No.: 14/427,651

(22) PCT Filed: May 22, 2014

(86) PCT No.: PCT/JP2014/002699
§ 371 (c)(1),
(2) Date: Mar. 12, 2015

(87) PCT Pub. No.: WO2014/196140
PCT Pub. Date: Dec. 11, 2014

(65) Prior Publication Data
US 2015/0248742 A1    Sep. 3, 2015

(30) Foreign Application Priority Data

Jun. 3, 2013 (JP) .................................. 2013-116803

(51) Int. Cl.
*G06T 1/00* (2006.01)
*G06T 1/60* (2006.01)
(Continued)

(52) U.S. Cl.
CPC ................. *G06T 1/60* (2013.01); *G06F 9/48* (2013.01); *G06T 1/20* (2013.01); *G09G 5/003* (2013.01);
(Continued)

(58) Field of Classification Search
CPC . G06T 1/60; G06T 1/20; G09G 5/003; G09G 5/18; G09G 5/39; G09G 2360/08; G09G 2380/10; G06F 9/48
(Continued)

(56) References Cited

U.S. PATENT DOCUMENTS

2004/0160446 A1    8/2004 Gosalia et al.
2006/0146057 A1    7/2006 Blythe
(Continued)

FOREIGN PATENT DOCUMENTS

JP    10-297318    11/1998
JP    2002-133428    5/2002
(Continued)

OTHER PUBLICATIONS

U.S. Appl. No. 14/427,657 to Hiroyasu Makino et al., filed Mar. 12, 2015.
(Continued)

*Primary Examiner* — Ke Xiao
*Assistant Examiner* — Kim-Thanh T Tran
(74) *Attorney, Agent, or Firm* — Greenblum & Bernstein, P.L.C.

(57) ABSTRACT

A graphics display processing device including: a graphics processor that executes GPU instructions based on a primary drawing instruction and a secondary drawing instruction; an acquirer) that acquires the primary drawing instruction and the secondary drawing instruction; an estimator that calculates an estimated GPU processing time required for executing the GPU instructions; a determiner that determines,
(Continued)

using the estimated GPU processing time, which of the primary drawing instruction and the secondary drawing instruction is to be executed first; an issuance controller that performs a control when the primary drawing instruction is to be executed first, causing the primary drawing instruction to be issued and issuance of the secondary drawing instruction to be postponed; an instruction issuer that issues each drawing instruction according to the control of the issuance controller; and a graphics driver that generates the GPU instructions by executing each drawing instruction issued.

12 Claims, 21 Drawing Sheets

(51) Int. Cl.
*G06F 9/48* (2006.01)
*G09G 5/39* (2006.01)
*G06T 1/20* (2006.01)
*G09G 5/00* (2006.01)
*G09G 5/18* (2006.01)

(52) U.S. Cl.
CPC ............... *G09G 5/18* (2013.01); *G09G 5/39* (2013.01); *G09G 2360/08* (2013.01); *G09G 2380/10* (2013.01)

(58) Field of Classification Search
USPC ......................................................... 345/522
See application file for complete search history.

(56) References Cited

U.S. PATENT DOCUMENTS

| | | | |
|---|---|---|---|
| 2008/0158096 A1* | 7/2008 | Breed | B60N 2/002 345/7 |
| 2008/0301687 A1 | 12/2008 | Gosalia et al. | |
| 2010/0122259 A1 | 5/2010 | Gosalia et al. | |
| 2012/0069032 A1 | 3/2012 | Hansson et al. | |
| 2013/0021353 A1 | 1/2013 | Drebin et al. | |
| 2013/0038614 A1* | 2/2013 | Dadi | G06T 1/00 345/501 |
| 2014/0022266 A1* | 1/2014 | Metz | G06T 1/20 345/522 |
| 2014/0139533 A1* | 5/2014 | Jan | G06F 15/76 345/520 |

FOREIGN PATENT DOCUMENTS

| | | |
|---|---|---|
| JP | 2006-190281 | 7/2006 |
| JP | 2009-101798 | 5/2009 |
| JP | 2009-205537 | 9/2009 |
| JP | 2010-287254 | 12/2010 |
| JP | 2012-002952 | 1/2012 |
| JP | 2012-064206 | 3/2012 |
| JP | 2013-025823 | 2/2013 |

OTHER PUBLICATIONS

International Search Report (ISR) in International Patent Application No. PCT/JP2014/002699, dated Jul. 22, 2014.

* cited by examiner

FIG. 6

```
Primary program while (processing repeated a number of times equal to the number of objects)
{
801 — glUseProgram();      // Display shader program switching
802 — glUniform();         // Set constant value to pass to shader program
803 — glBindBuffer();      // Parameter data buffer switching
    while (processing repeated a number of time equal to the number of vertices)
804 —   glVertexAttribPointer();   // Data specification
805 —   glDrawElements();          // GPU processing instruction
    }
806 — glFinish();          // Wait for completion of execution of drawing commands
}
807 — glSwapBuffers();     // Frame buffer display/drawing switching
```

FIG. 7

```
GPU program
851 ── GpuFuncCall (swichProgram);              // GPU program execution
852 ── Gpumemcpy (GPUMemoryAddress, CPUMemoryAddress, size, CPUtoGPU);
853 ── GpuFuncCall (bufferareaswitch);          // GPU program execution 854 ── Gpumemcpy (GPUMemoryAddress, CPUMemoryAddress, size, CPUtoGPU);
855 ── GpuFuncCall (StartShader, multiple executions);// GPU program execution
856 ── GpuFuncCall (QueueEmpty);                // GPU program execution
857 ── Gpumemcpy (GPUMemoryAddress, CPUMemoryAddress, size, CPUtoGPU);
858 ── GpuFuncCall (StartShader, multiple executions);// GPU program execution
    ...
859 ── GpuFuncCall (WaitGPUIdle);               // GPU program execution
    ...
860 ── GpuFuncCall (AttachFrameBuffer);         // GPU program execution
```
⎯ 850

FIG. 9

Processing parameter table 200

| Cumulative CPUGPU processing time | —210 |
| Cumulative GPU processing time | —211 |
| Primary program estimated CPU processing time | —212 |
| Primary program estimated GPU processing time | —213 |
| Primary program processing start time | —214 |
| Secondary program estimated CPU processing time | —215 |
| Secondary program estimated GPU processing time | —216 |
| Secondary program processing start time | —217 |
| ⋮ | |
| Estimated remaining CPU processing time | —218 |
| Estimated remaining GPU processing time | —219 |
| Current time | —220 |

FIG. 10

Processing determination table 300

| Monitoring period | —310 |
| CPUGPU processing time limit | —311 |
| GPU processing time limit | —312 |
| CPUGPU processing priority time | —313 |
| GPU processing priority time | —314 |

FIG. 11

Estimated processing time table 400

| Estimated processing time information | | |
|---|---|---|
| Instruction classification | Estimated CPU processing time | Estimated GPU processing time |
| 1A | 1 | 1 |
| 1B | 2 | 2 |
| 1C | 1 | 1 |
| 2A | 3 | 2 |
| 2B | 10 | 5 |
| 2C | 3 | 5 |
| ⋮ | ⋮ | ⋮ |

Timing parameter table 500

| Issuance postponement request flag | 510 |
| Issuance postponement instruction presence flag | 511 |

GRAPHICS DISPLAY PROCESSING DEVICE, GRAPHICS DISPLAY PROCESSING METHOD, AND VEHICLE EQUIPPED WITH GRAPHICS DISPLAY PROCESSING DEVICE

TECHNICAL FIELD

The present disclosure is related to techniques of displaying a graphic that requires immediate display and a graphic that does not require immediate display in one frame.

BACKGROUND ART

Many computer systems that display graphics have a graphics processing unit (GPU) in addition to a central processing unit (CPU) such as a microprocessor. The GPU performs graphics operations that require a great deal of computing power (Patent Literature 1-4). Throughput of a computer system as a whole is improved by assigning graphics operations to the GPU and assigning other calculations to the CPU.

CITATION LIST

Patent Literature

Patent Literature 1: Japanese Patent Application Publication 2006-190281
Patent Literature 2: Japanese Patent Application Publication 2010-287254
Patent Literature 3: Japanese Patent Application Publication 2012-64206
Patent Literature 4: Japanese Patent Application Publication 2013-25823

SUMMARY OF INVENTION

Technical Problem

In a computer system provided with one CPU and one GPU, two application programs may be executed to cause the computer system to display graphics. A primary application program may, for example, be a computer program for displaying a speedometer of a car via a graphic. Such a graphic is a graphic that requires immediate display. For display of such a graphic, immediacy and urgency is required. Delay in display of such a graphic is not permitted. On the other hand, a secondary application program may, for example, be a computer program for displaying a map for guiding a driver of the car to a destination via a graphic. Such a graphic is a graphic that does not require immediate display. For display of such a graphic, immediacy and urgency is not required.

Drawing instructions to the GPU from each application program are processed by the GPU in the order the drawing instructions are issued. Thus, when a significant amount of time is required for the GPU to execute a secondary drawing instruction from the secondary application program, execution of a primary drawing instruction from the primary application program is delayed until execution of the secondary drawing instruction is completed. Thus, a problem arises that a graphic displayed via execution of the primary drawing instruction after completion of execution of the secondary drawing instruction does not correctly display the most recent state.

One aspect of the present disclosure aims to provide a graphics display processing device, a graphics display processing method, and a vehicle equipped with the graphics display processing device, each favorably maintaining display performance of a graphic requiring immediate display in a case in which the graphic requiring immediate display and a graphic not requiring immediate display are to be displayed in a single frame.

Solution to Problem

A graphics display processing device pertaining to one aspect of the present disclosure is a graphics display processing device that displays, in a single frame, a primary graphic requiring immediate display and a secondary graphic not requiring immediate display, the graphics display processing device comprising: a program storage that stores a primary drawing instruction specifying drawing of the primary graphic and a secondary drawing instruction specifying drawing of the secondary graphic; a graphics processor that performs drawing processing by executing GPU instructions generated based on each drawing instruction; an acquirer that acquires the primary drawing instruction and the secondary drawing instruction from the program storage; an estimator that calculates an estimated GPU processing time required for the drawing processing by the graphics processor due to execution of the GPU instructions generated based on the primary drawing instruction or the secondary drawing instruction; a determiner that determines, by using the estimated GPU processing time, which of the primary drawing instruction and the secondary drawing instruction is to be executed first; an issuance controller that performs a control when the determiner determines that the primary drawing instruction is to be executed first, causing the primary drawing instruction to be issued and issuance of the secondary drawing instruction to be postponed; an instruction issuer that issues each drawing instruction according to the control of the issuance controller; and an instruction executor that generates the GPU instructions by executing each drawing instruction issued.

Note that comprehensive or specific aspects of the present disclosure may be implemented as any one of a system, method, integrated circuit, computer program, and storage medium, and may be implemented as any combination of a system, device, method, integrated circuit, computer program, and storage medium.

Advantageous Effects of Invention

The graphics display processing device pertaining to the one aspect of the present disclosure favorably maintains display performance of a graphic requiring immediate display in a case in which the graphic requiring immediate display and a graphic not requiring immediate display are to be displayed in a single frame.

BRIEF DESCRIPTION OF DRAWINGS

FIG. 6 is a diagram illustrating one example of content of a primary program 11.

FIG. 7 is a diagram illustrating one example of content of a GPU program.

FIG. 9 is a diagram illustrating one example of a data structure of a processing parameter table 200.

FIG. 10 is a diagram illustrating one example of a data structure of a processing determination table 300.

FIG. 11 is a diagram illustrating one example of a data structure of an estimated processing time table 400.

FIG. 12 is a diagram illustrating one example of a data structure of a timing parameter table 500.

EMBODIMENT

1. Embodiment

A vehicle 10 is herein described as one embodiment of the present disclosure.

1.1 Vehicle 10

Figure 1:
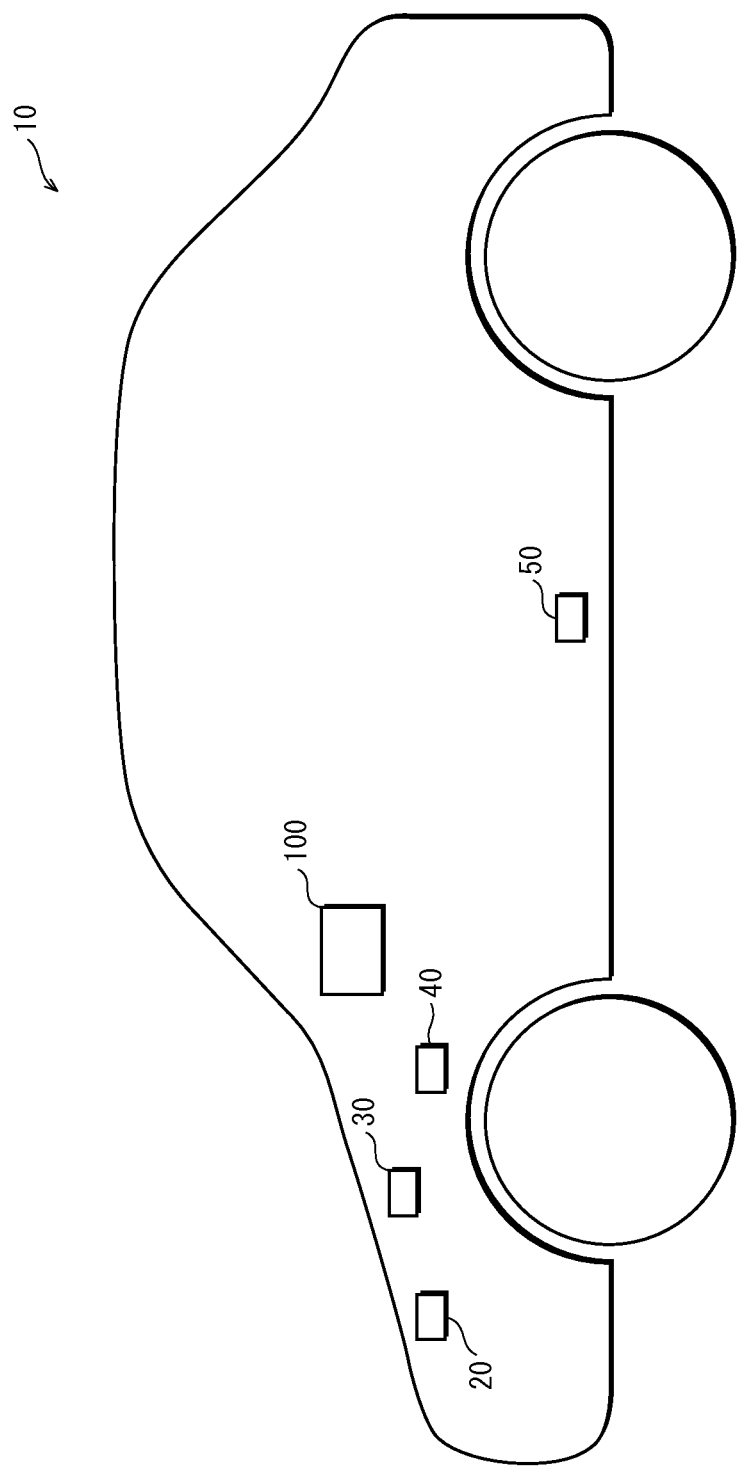
FIG. 1 is a diagram illustrating one example of a vehicle 10 equipped with a graphics display processing device 100 of an embodiment.

FIG. 1 is a diagram illustrating one example of the vehicle 10 equipped with a graphics display processing device 100 of the present embodiment.

The vehicle 10, as illustrated in FIG. 1, includes the graphics display processing device 100, a temperature sensor 20, a revolution sensor 30, a speed sensor 40, and a fuel sensor 50.

The graphics display processing device 100 is described later. The temperature sensor 20, revolution sensor 30, speed sensor 40, and fuel sensor 50 are sensors that measure temperature of coolant used in a radiator for engine heat dissipation, revolutions of an engine or motor of the vehicle 10, speed at which the vehicle 10 is travelling, and amount of fuel in the vehicle 10, respectively.

The vehicle 10 is a gasoline-powered car, but may, for example, be a hybrid car, an electric vehicle, etc. Further, the vehicle 10 is a passenger car, but may be a freight vehicle, a dump truck, etc., and may be a specialized vehicle such as a fire engine, ambulance, etc. Further, the vehicle 10 may be an electric locomotive, diesel locomotive, train, linear motor car, etc. Further, various sensors and the graphics display processing device 100 may be included in an aircraft, ship, etc.

The graphics display processing device 100 displays a primary graphic requiring immediate display and a secondary graphic not requiring immediate display in a single frame.

Figure 2:
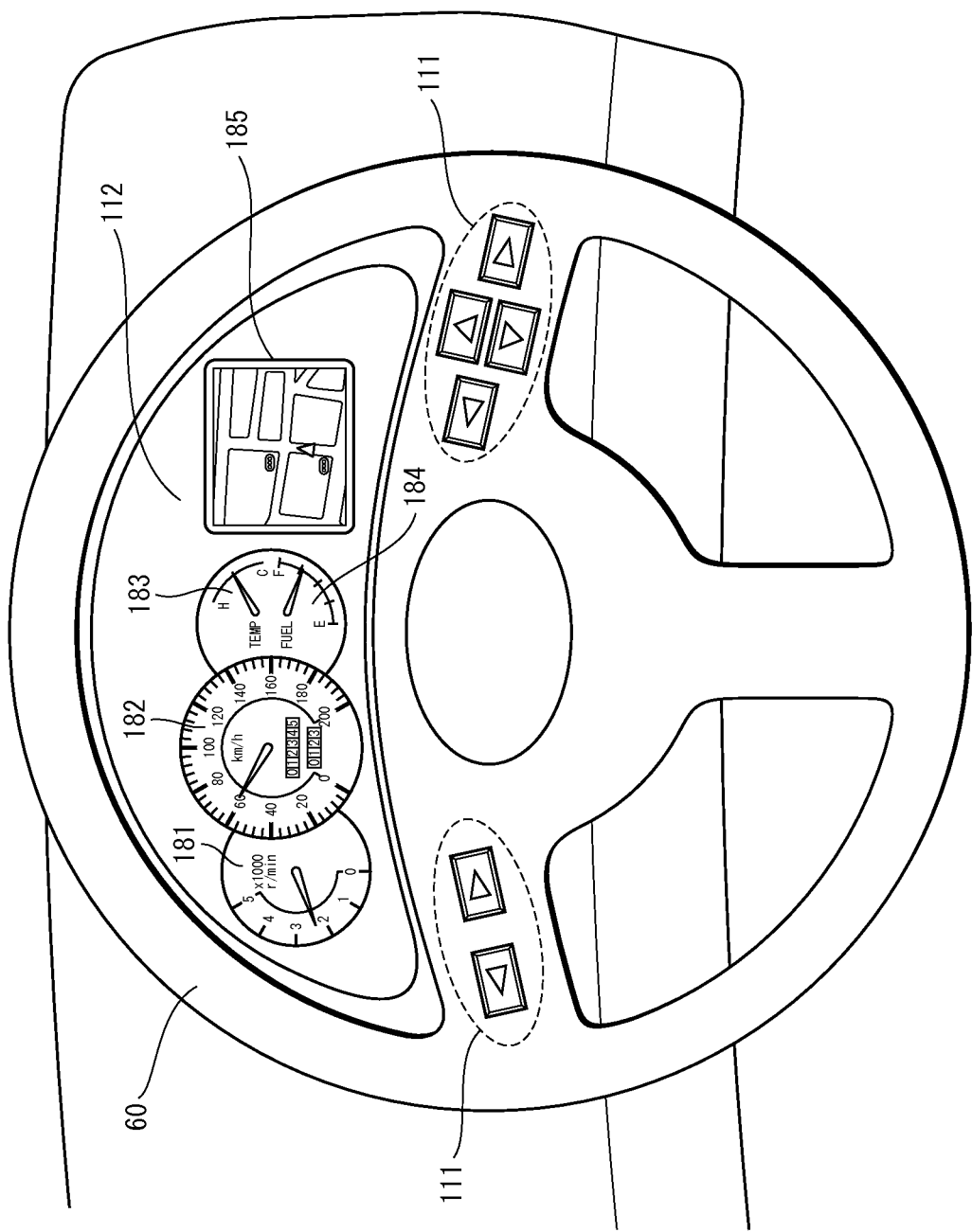
FIG. 2 is a diagram illustrating one example of a display 112 viewed from a driver's seat of the vehicle 10.

FIG. 2 is a diagram illustrating one example of a display 112 of the graphics display processing device 100, viewed over a steering wheel 60 from a driver's seat of the vehicle 10. As illustrated in the diagram, a revolution speed meter 181, a speedometer 182, a temperature meter 183, a fuel meter 184, and a map 185 are displayed via graphics in the display 112 in a single frame.

The speedometer 182 is a graphic displaying speed, acquired from the speed sensor 40, of the vehicle 10 by using a scale and a needle as in an analog meter. In the same way, the revolution speed meter 181, the temperature meter 183, and the fuel meter 184 are graphics displaying revolution speed, temperature, and fuel amount acquired from the revolution sensor 30, the temperature sensor 20, and the fuel sensor 50, respectively. The map 185 is a map graphic displayed to guide a driver of the vehicle 10.

The revolution speed meter 181 and the speedometer 182 are primary graphics requiring immediate display. For display of such graphics, immediacy and urgency are required, and a delay in displaying is not permitted. Note that the primary graphics requiring immediate display are not limited to the revolution speed meter 181 and the speedometer 182. The primary graphics may be graphics that display, as warnings or alerts, anomalies related to mechanisms, equipment, machinery, etc., in a vehicle, train, etc., or anomalies related to traffic conditions around the vehicle 10.

On the other hand, the temperature meter 183, the fuel meter 184, and the map 185 are secondary graphics not requiring immediate display. For display of such graphics, immediacy and urgency is not required. Note that the secondary graphics not requiring immediate display are not limited to the temperature meter 183, the fuel meter 184, and the map 185. The secondary graphics may, for example, be graphics displaying an operation screen for operation of a music playback device. The music playback device is included in the vehicle 10.

1.2 Overview of Graphics Display Processing Device 100

An overview of the graphics display processing device 100 is described herein.

The graphics display processing device 100 is provided with a bandwidth controller 152, which is described later. The bandwidth controller 152 outputs drawing instructions included in a primary program 11 and a secondary program 12, which are described later, to a graphics driver 153, also described later. At such time, the bandwidth controller 152 gives priority to outputting drawing instructions from a program requiring immediate display to the graphics driver 153. With respect to drawing instructions from a program not requiring immediate display, the bandwidth controller 152 allows drawing using spare bandwidth after display performance of a program requiring immediate display is ensured. In other words, the bandwidth controller 152 issues drawing instructions to the graphics driver 153, forcing drawing instructions not requiring immediate display to be postponed or adjusting priority order of drawing instructions.

The graphics driver 153 interprets the drawing instructions and performs processing to be executed by a CPU 120. Subsequently, the graphics driver 153 generates GPU instructions (also referred to as drawing processing instructions or drawing processing commands) corresponding to drawing processing to be executed by a GPU 122 in accordance with interpretation results. At such time, the graphics driver 153 processes data and associates such processing data with the GPU instructions. Subsequently, the graphics driver 153 stores the GPU instructions in a command queue buffer 15.

The GPU 122 performs drawing processing according to GPU instructions received from the command queue buffer 15 and stores drawing image data as drawing results in a frame buffer 155. At such time, when processing data associated with the GPU instructions exists, the GPU 122 performs drawing processing according to the GPU instructions by using the processing data.

The display 127 extracts and displays the drawing image data stored in the frame buffer 155 at timings according to a frame rate.

Content of the frame buffer 155 is, for example, updated about 60 times a second (the frame rate). However, in a case in which processing load of the CPU or the GPU is high, update speed decreases. Thus, a situation may occur in which a user is unable to read the most recent information from images displayed on the display 127.

1.3 Hardware Configuration of Graphics Display Processing Device 100

Figure 3:
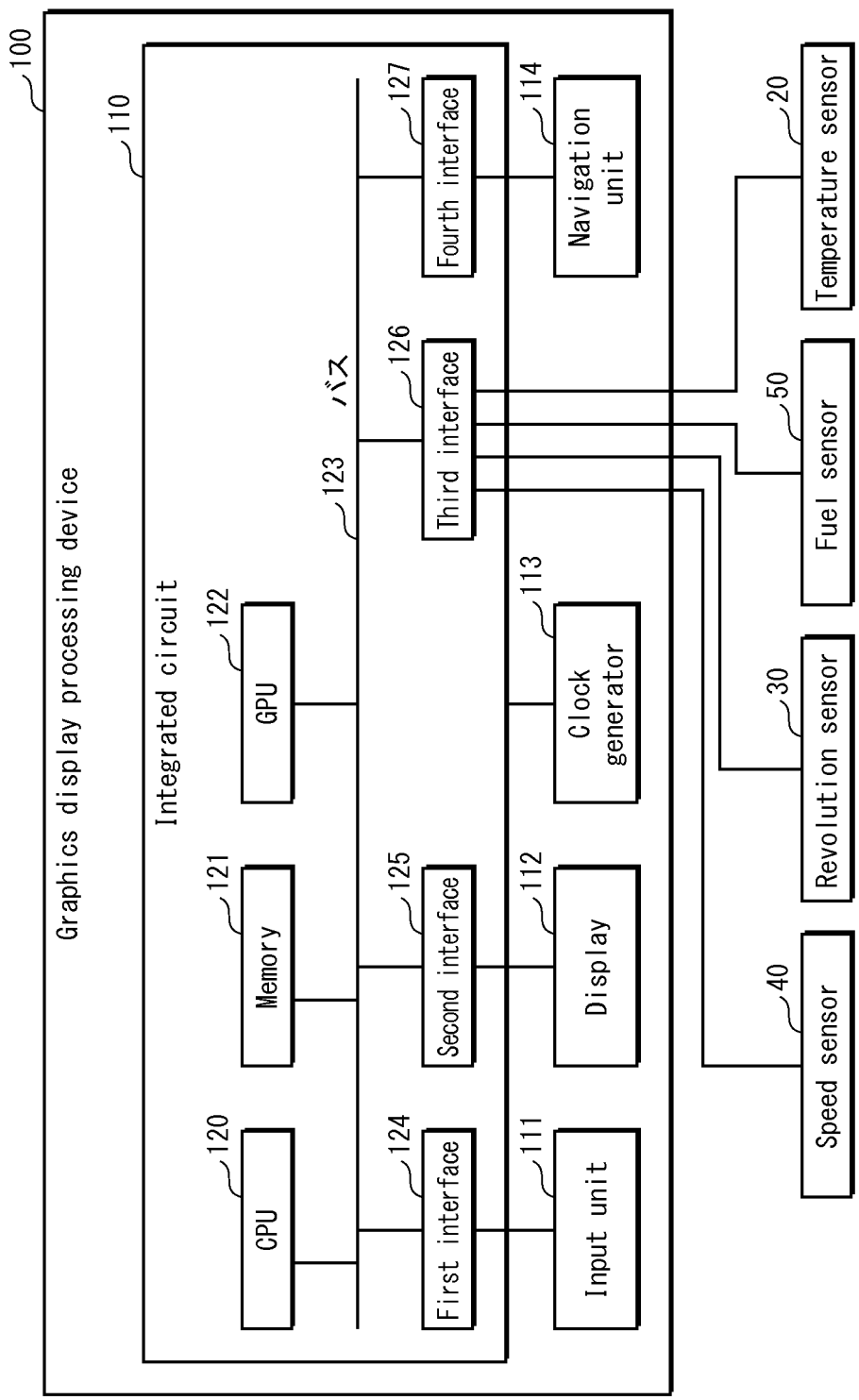
FIG. 3 is a block diagram illustrating one example of a configuration of the graphics display processing device 100.

The graphics display processing device 100, as illustrated in FIG. 3, is composed of an integrated circuit 110, an input unit 111, a display 112, a clock generator 113, and a navigation unit 114. The integrated circuit 110, as illustrated, is composed of the CPU 120, a memory 121, the GPU 122, a bus 123, a first interface 124, a second interface 125, a third interface 126, and a fourth interface 127.

The bus 123 connects the CPU 120, the memory 121, the GPU 122, the first interface 124, the second interface 125, the third interface 126, and the fourth interface 127 to each other. The bus 123 relays transmission of signals between the CPU 120, the memory 121, the GPU 122, the first interface 124, the second interface 125, the third interface 126, and the fourth interface 127.

The memory 121 includes semiconductor memory and a portion of the memory 121 is composed of flash memory. Further, the memory 121 has read-only memory (ROM) and random access memory (RAM). A program storage 151, a data storage 154, and the frame buffer 155 are included in the memory 121.

Stored in the program storage 151 are: the primary program 11, the secondary program 12, and other programs, which specify operation of the CPU 120; data used by each program that specifies operation of the CPU 120; programs that specify operation of the GPU 122; and data used by each program that specifies operation of the GPU 122.

Retained in the data storage 154 are the command queue buffer 15 and other data.

The frame buffer 155 is composed of one frame buffer memory. Stored in the frame buffer 155 is drawing image data for one frame according to the primary program 11 and the secondary program 12. The drawing image data for one frame is displayed via the display 127.

Note that the frame buffer 155 may be composed of a primary frame buffer memory and a secondary frame buffer memory. Stored in the primary frame buffer memory is drawing image data for one frame according to the primary program 11. Stored in the secondary frame buffer memory is drawing image data for one frame according to the secondary program 12. The drawing image data stored in the primary frame buffer memory and the drawing image data stored in the secondary frame buffer memory are combined at a timing according to the frame rate. As a result, the drawing image data for one frame is generated. The display 112 may read and display the drawing image data for one frame generated by such combining.

The first interface 124 is connected to the input unit 111 and relays input and output of signals from and to the input unit 111. The second interface 224 is connected to the display 112 and relays input and output of signals from and to the display 112. The third interface 126 is connected to the temperature sensor 20, the revolution sensor 30, the speed sensor 40, and the fuel sensor 50, and relays input and output of signals from and to the temperature sensor 20, the revolution sensor 30, the speed sensor 40, and the fuel sensor 50. The fourth interface 127 is connected to the navigation unit 114 and relays input and output of signals to and from the navigation unit 114.

The input unit 111, as one example, is composed from a plurality of buttons, etc., provided on a front surface of the steering wheel 60. When a driver of the vehicle 10 operates a button, the input unit 111 outputs an operation signal corresponding to the button so operated to the CPU 120 via the first interface 124.

The display 112, as one example, is composed from a liquid crystal display, etc. The display 112 displays character strings, images, etc., based on signals transmitted from the CPU 120 due to execution of a program by the CPU 120. Further, the display 112 displays the drawing image data for one frame that is stored in the frame buffer 155.

The CPU 120 controls the GPU 122, the input unit 111, the display 112, and the clock generator 113 by execution of programs stored in the memory 121. In this way, the CPU 120 causes the graphics display processing device 100 to function. In particular, by execution of a program stored in the memory 121, the CPU 120 specifies to the GPU 122 a program and data stored in the memory 121. Subsequently, the CPU 120 controls execution by the GPU 122 due to the program and data so specified.

The GPU 122 performs drawing processing. Specifically, the GPU 122 executes the GPU instructions generated based on each drawing instruction, and manipulates data stored in the memory 121. As a result, the GPU 122 generates drawing image data indicating a character string, image, etc. The GPU 122 writes the drawing image data so generated to the frame buffer 155.

The navigation unit 114 retains map data. The navigation unit 114, in accordance with progress of the vehicle 10, outputs map data in the vicinity of a current position of the vehicle 10 and other map data.

1.4 Functional Configuration of Graphics Display Processing Device 100

Here, a configuration of the graphics display processing device 100 is described from a functional perspective with reference to the drawings.

Figure 4:
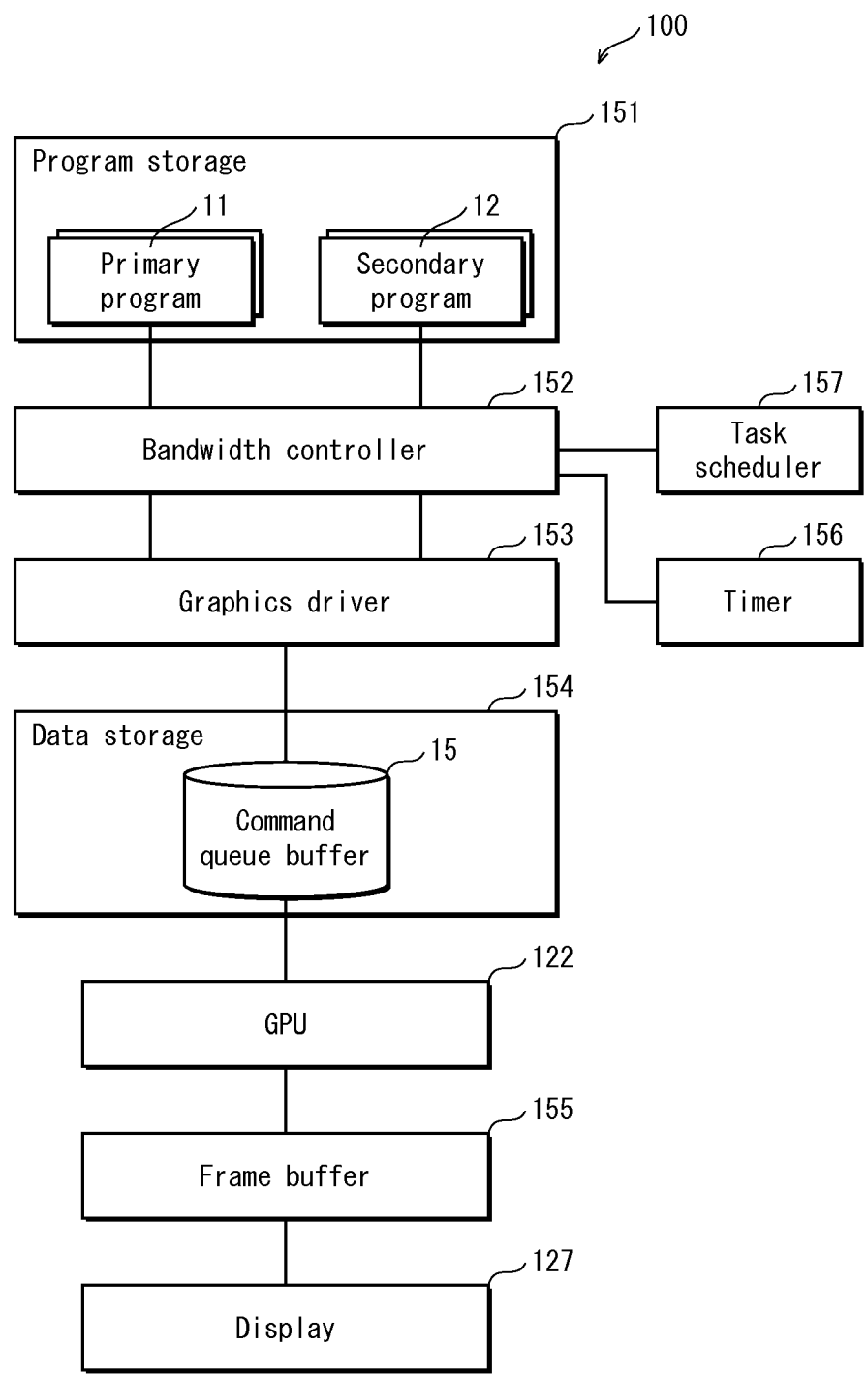
FIG. 4 is a block diagram illustrating one example of a functional configuration of the graphics display processing device 100.

The graphics display processing device 100, as illustrated in FIG. 4, is composed of the program storage 151, the bandwidth controller 152, the graphics driver 153, the data storage 154, the GPU 122, the frame buffer 155, a display 127, a timer 156, and a task scheduler 157.

(1) Program Storage 151

The program storage 151 stores the primary program 11, the secondary program 12, and other computer programs.

The primary program 11 is a computer program including a primary drawing instruction instructing drawing of a primary graphic requiring immediate display. In other words, the primary program 11 is, for example, a program that requires display without any delay. No delay in displaying means that within a frame display unit time, the drawing image data for one frame in the frame buffer 155 needs to be completed. With respect to a moving image, a plurality of frames are displayed in a unit time. The frame display unit time is such a unit time. The primary program 11 is executed on the CPU 120. Note that the primary drawing instruction included in the primary program 11 is also referred to as a drawing instruction and a CPU instruction.

The secondary program 12 is a computer program including a secondary drawing instruction instructing drawing of a secondary graphic not requiring immediate display. The secondary program 12 is, for example, a program for which delay in display is permitted. Delay in displaying being permitted means that, for example, within a frame display unit time, the drawing image data for one frame in the frame buffer 155 does not need to be completed. The secondary program 12 is executed on the CPU 220. Note that the secondary drawing instruction included in the secondary program 21 is also referred to as a drawing instruction and a CPU instruction.

The drawing instructions included in the primary program 11 and the secondary program 12 are read by a drawing instruction reader. The drawing instruction reader is a computer program stored in the memory 121. The CPU 120, via execution of such a computer program, i.e. via the drawing instruction reader, reads each drawing instruction from the primary program 11 and the secondary program 12. Subsequently, each drawing instruction read by the drawing instruction reader is transmitted to the bandwidth controller 152.

Primary Program 800

FIG. 6 is a diagram illustrating one example of content of the primary program 11.

A primary program 800 is one example of content of the primary program 11. The primary program 800 includes, as one example illustrated in FIG. 6, CPU instructions 801, 802, 803, . . . , 807 as primary drawing instructions. Each CPU instruction is executed by the CPU 120.

As one example, the CPU instruction 801 is an instruction to switch to a display shader program. The CPU instruction 802 is an instruction to set a constant value to be passed to the display shader program. The CPU 803 is an instruction to switch to a parameter data buffer. The CPU instruction 804 is an instruction to specify data. The CPU instruction 805 is an instruction to the GPU 122 to perforin processing. The CPU instruction 806 is an instruction for queuing the CPU 120 to wait for all processing of instructions executed by the GPU 122 to be completed. The CPU instruction 807 is an instruction to switch to a display/drawing surface of a frame buffer.

The CPU instructions 804 and 805 are repeated a number of times corresponding to the number of vertices of an object.

CPU instructions 801 to 806 are repeated a number of times corresponding to the number of objects to be drawn. For example, in a case in which objects are to be drawn that represent the scale of the speedometer, the needle of the speedometer, and a shadow caused by the needle of the speedometer, initially background objects are drawn. Subsequently, the object of the needle of the speedometer is generated (not drawn at this point). Subsequently, the object of the shadow due to the needle of the speedometer is generated and drawn. Finally, the object of the needle of the speedometer is drawn. Objects such as the needle of the speedometer are, for example, drawn by creating a curved surface that is a combination of a plurality of triangles by repeating the CPU instructions 804 and 805.

The primary program 800 is a computer program for generating and drawing objects that are primary graphics requiring immediate display. On the other hand, the secondary program 12 for generating and drawing objects that are secondary graphics not requiring immediate display is different from the primary program only in the objects to be drawn. For example, when drawing a map that is a secondary graphic not requiring immediate display via the secondary program 12, background objects, road objects, traffic signal objects, etc., are generated and drawn. Similar processing to the primary program 11 is performed by the secondary program 12.

GPU Program 850

The following describes GPU programs generated by execution of the primary program 800. FIG. 7 is a diagram illustrating one example of content of a GPU program so generated.

The GPU program 850, which is one example of content of the GPU program so generated, contains, as illustrated as one example in FIG. 7, GPU instructions 851, 852, 853, . . . , 860. Each GPU instruction is executed by the GPU 122.

The GPU instructions 851, 853, 855, 856, 858, 859, and 860 are instructions to execute GPU programs. The GPU instructions 852, 854, and 857 are instructions for copying content of memory.

In particular, the GPU instruction 859 is an instruction to wait for a processing request queue for processing requests from the CPU 120 to the GPU 122 to be empty and for the GPU 122 to be in a wait state after completing processing. Further, the GPU instruction 860 is an instruction specifying a frame buffer to be the subject of drawing by the GPU 122.

Pairs of the GPU instructions 854 and 855 exist in numbers corresponding to the numbers of vertices of an object. Further, the GPU instructions from the GPU instruction 851 to the GPU instruction 859 each exist in numbers equal to the number of objects to be drawn.

Note that each GPU instruction included in the GPU programs is generated by the graphics driver 153. Each time the graphics driver 153 generates a GPU instruction, the GPU instruction so generated is written to the command queue buffer 15 of the data storage 154.

(2) Bandwidth Controller 152

The bandwidth controller 152 is composed of a computer program stored in the memory 121. The computer program is read from the memory 121 by the CPU 120 and executed by the CPU 120. In this way, the bandwidth controller 152 functions.

The bandwidth controller 152 receives, for example, a primary drawing instruction included in the primary program 11 and a secondary drawing instruction included in the secondary program 12. The bandwidth controller 152 performs determination regarding which of the primary drawing instruction and the secondary drawing instruction so received is prioritized to be executed by the graphics driver 153. The bandwidth controller 152 delays execution of the secondary drawing instruction by the graphics driver 153 or lowers the priority of processing of the secondary drawing instruction. Details of the bandwidth controller 152 are described later.

(3) Graphics Driver 153

The graphics driver 153, as indicated below, generates GPU instructions by execution of each drawing instruction issued.

The graphics driver 153 is composed of a computer program stored in the memory 121. The computer program is read from the memory 121 by the CPU 120 and executed by the CPU 120. In this way, the graphics driver 153 functions.

The graphics driver 153 interprets the primary drawing instruction included in the primary program 11 and the secondary drawing instruction included in the secondary program 12 that are received from the bandwidth controller 152. Subsequently, the graphics driver 153, after processing to be executed by the CPU 120 is executed and according to results of interpretation of the primary drawing instruction, generates GPU instructions for drawing processing to be performed by the GPU 122. The GPU instructions are also referred to as drawing processing instructions and drawing processing commands. Subsequently, the graphics driver 153 writes the GPU instructions to the command queue buffer 15 in the order the GPU instructions are generated.

At such time, the processing to be executed by the CPU 120 is, for example, additional processing so that data can be processed by the GPU 122. Such data is, for example, stored in the memory 121.

Hereafter, "the graphics driver 153 interprets drawing instructions and processing to be executed by the CPU 120 is executed" is referred to as "drawing instructions are executed by the CPU 120".

One example of an order in which the graphics driver 153 generates GPU instructions from CPU instructions is described here by using the CPU instructions included in the primary program 800 illustrated in FIG. 6.

(a) Processing for the CPU Instruction 801

In "glUseProgram( )" in the CPU instruction 801, information is included related to which program to use from among programs executable by the GPU 122.

The graphics driver 153 executes the CPU instruction 801. In this way, the graphics driver 153 converts the CPU instruction 801 to the GPU instruction 851 (GpuFuncCall) that calls the GPU 122. The GPU instruction 851 is illustrated in FIG. 7. At this time, as an argument, the GPU instruction 851 specifies a program to be called. In the GPU instruction 851 of FIG. 7, "swichProgram" is one example of a program to be called on the GPU 122.

(b) Processing for the CPU Instruction 802

The graphics driver 153 executes the CPU instruction 802. In this way, the graphics driver 153 converts the CPU instruction 802 to the GPU instruction 852 (Gpumemcpy). The GPU instruction 852 (Gpumemcpy) is an instruction for transferring information about a constant value to be passed to the display shader program to memory used by the GPU 122. The display shader program is stored on memory used by the CPU 120 and executed on the GPU 122. Parameter specified in the GPU instruction 852 are included in the program of the CPU instruction 802 (glUniform( )).

The parameters in the GPU instruction 852 have the following meanings.

GPUMemoryAddress: Address of GPU memory that is the transfer destination

CPUMemoryAddress: Address of CPU memory that is the transfer origin

Size: Size of data to be transferred

CPUtoGPU: Indicates transfer from the CPU to the GPU (c) Processing for the CPU Instruction 803

The graphics driver 153 executes the CPU instruction 803. In this way, the graphics driver 153 converts the CPU instruction 803 to a GPU instruction 853 (GpuFuncCall (bufferareaswitch)). The GPU instruction 853 (GpuFuncCall (bufferareaswitch)) performs processing to switch to memory of any area of memory used by the GPU 122.

As illustrated in FIG. 7, as a parameter of the GPU instruction 853, the instruction to switch to an area (bufferareaswitch) is specified.

(d) Processing for the CPU Instruction 804

The graphics driver 153 executes the CPU instruction 804. In this way, the graphics driver 153 calculates which data to use of data areas used on the GPU 122 and stores a result of such calculation in memory used by the CPU 120. Subsequently, the graphics driver 153 converts the CPU instruction 804 to a GPU instruction 854 (Gpumemcpy) that transfers stored data to memory used by the GPU 122.

The parameters in the GPU instruction 854 have the following meanings.

GPUMemoryAddress: Address of GPU memory that is the transfer destination

CPUMemoryAddress: Address of CPU memory that is the transfer origin

Size: Size of data to be transferred

CPUtoGPU: Indicates transfer from the CPU to the GPU

Note that the graphics driver 153 calculates, on the CPU 120, vector coordinate data to be used by the next instruction and stores a result of the calculation on memory used by the CPU 120. The graphics driver 153 may convert the GPU instruction (Gpumemcpy) that transfers stored data to memory used by the GPU 122.

(e) Processing for the CPU Instruction 805

The graphics driver 153 executes the CPU instruction 805. In this way, the graphics driver 153 converts the CPU instruction 805 to a GPU instruction 855 (GpuFuncCall (StartShader, multiple executions)). The GPU instruction 855 instructs calling and execution of a program to be processed on the GPU 122 by using vertex coordinate data transferred to memory used by the GPU 122, due to execution of the CPU instruction 804 (glVertexAttribPointer( )) one line above.

The parameters in the GPU instruction 855 have the following meanings.

StartShader: Indicates start of a program (Shader program) of the GPU 122 defined by parameters of glUseProgram( ).

Multiple executions: A Shader program performs primarily matrix operations. The GPU 122 includes multiple processors able to process matrix operations in parallel. Here, the number of processors using parallel processing is defined.

(f) Processing for the CPU Instruction 806

The graphics driver 153 executes the CPU instruction 806. In this way, a queue buffer of GPU instructions from the CPU 120 to the GPU 122 is emptied, and the CPU 120 waits for completion of processing of GPU instructions. Queuing is performed to switch processing programs.

Because the graphics driver 153 waits for completion of processing of GPU instructions, a GPU instruction 859 (GpuFuncCall(WaitGPUIdle)) that waits for processing of GPU 122 to be idle is issued, and the CPU 120 waits for completion of processing of GPU instructions.

(g) Processing for the CPU Instruction 807

The graphics driver 153 executes the CPU instruction 807. In this way, the graphics driver 153 converts the CPU instruction 807 to a GPU instruction 860 (GpuFuncCall (AttachFrameBuffer)) that calls a program for switching to a frame buffer. Here, parameters such as a memory address of a frame buffer to be used in a next drawing are defined in AttachFrameBuffer. Subsequently, the CPU 120 performs processing to define an address of a frame buffer for display with respect to a secondary interface 125 (for example, DVI, HDMI (registered trademark), etc.) for display on a screen.

(4) Command Queue Buffer 15

The command queue buffer 15 is a memory that associates, retains, and manages GPU instructions and processing data. The command queue buffer 15 enables the GPU 122 to read and execute drawing processing commands in a temporal order that GPU instructions are outputted from the graphics driver 153.

Figure 8:
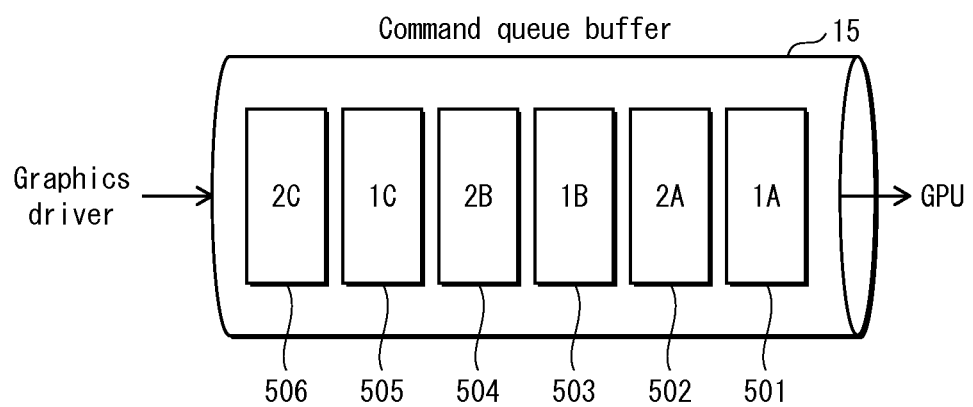
FIG. 8 is a diagram illustrating one example of a command queue buffer 15.

FIG. 8 is a diagram illustrating one example of GPU instructions stored in the command queue buffer 15.

As illustrated, the command queue buffer 15 stores a GPU instruction 501 (1A), a GPU instruction 502 (2A), a GPU instruction 503 (1B), a GPU instruction 504 (2B), a GPU instruction 505 (1C), and a GPU instruction 506 (2C) in the stated order.

In a case in which the primary program 11 and the secondary program 12 are processed in parallel, GPU instructions corresponding to CPU instructions are stored in the command queue buffer 15 via the graphics driver 153, originating alternately from the primary program 11 and secondary program 12 as illustrated in the example. The GPU 122 performs execution of GPU instructions in the temporal order that the GPU instructions are entered into the command queue buffer 15.

The command queue buffer 15 receives GPU instructions originating from the primary program 11 and the secondary program 12 from the graphics driver 153. GPU instructions originating from the primary program 11 are the GPU instruction 501 (1A), the GPU instruction 503 (1B), and the GPU instruction 505 (1C). GPU instructions originating from the secondary program 12 are the GPU instruction 502 (2A), the GPU instruction 504 (2B), and the GPU instruction 506 (2C).

When the GPU instruction 501 (1A), the GPU instruction 503 (1B), and the GPU instruction 505 (1C) are completed by the GPU 122, drawing of drawing image data for a single frame is complete with respect to the primary program 11.

When the GPU instruction 502 (2A), the GPU instruction 504 (2B), and the GPU instruction 506 (2C) are completed by the GPU 122, drawing of drawing image data for a single frame is complete with respect to the secondary program 12.

(5) GPU 122

The GPU 122 receives GPU instructions from the command queue buffer 15. The GPU 122 performs drawing processing corresponding to the GPU instructions by using processing data associated with the GPU instructions. As a result, the GPU 122 generates drawing image data. Subsequently, the GPU 122 outputs drawing image data resulting from drawing processing to the frame buffer 155.

For example, a computer program corresponding to drawing processing associated with GPU instructions is stored in the memory 121. When the GPU 122 receives GPU instructions, such a computer program corresponding to drawing processing associated with such GPU instructions is executed by the GPU 122.

(6) Frame Buffer 155

The frame buffer 155 is a memory storing drawing image data for a single frame that is a result of drawing processing.

(7) Display 112

The display 112 reads drawing image data for a single frame that is stored in the frame buffer 155 at timings based on a frame rate, and displays the drawing image data for a single frame.

(8) Timer 156

The timer 156 manages time, has a function that returns the current time, and has a function that waits during a specified time and returns a signal after the specified time elapses.

The timer 156 receives a monitoring period from the determiner 163 and sets the monitoring period within the timer 156. The monitoring period is equivalent to the frame display unit time. At such time, the timer 156 monitors progress of the monitoring period by subtracting a unit time from the monitoring period set in the timer 156 after every unit time elapses. Here, the unit time is, for example, 0.01 milliseconds. Note that the unit time is different to the frame display unit time described above. When the monitoring period becomes "0", the monitoring period is considered ended, and the timer 156 notifies the determiner 163 of the end of the monitoring period. When the monitoring period ends, the timer 156 receives another monitoring period from the determiner 163 and sets the new monitoring period within the timer 156. In this way, the timer 156 repeats monitoring of progress of the monitoring period.

(9) Task scheduler 157

The task scheduler 157, based on the priority set by a priority setter 167, determines an order of execution of drawing instructions from a plurality of programs, and causes execution of the drawing instructions according to the order so determined.

1.5 Bandwidth Controller 152

Figure 5:
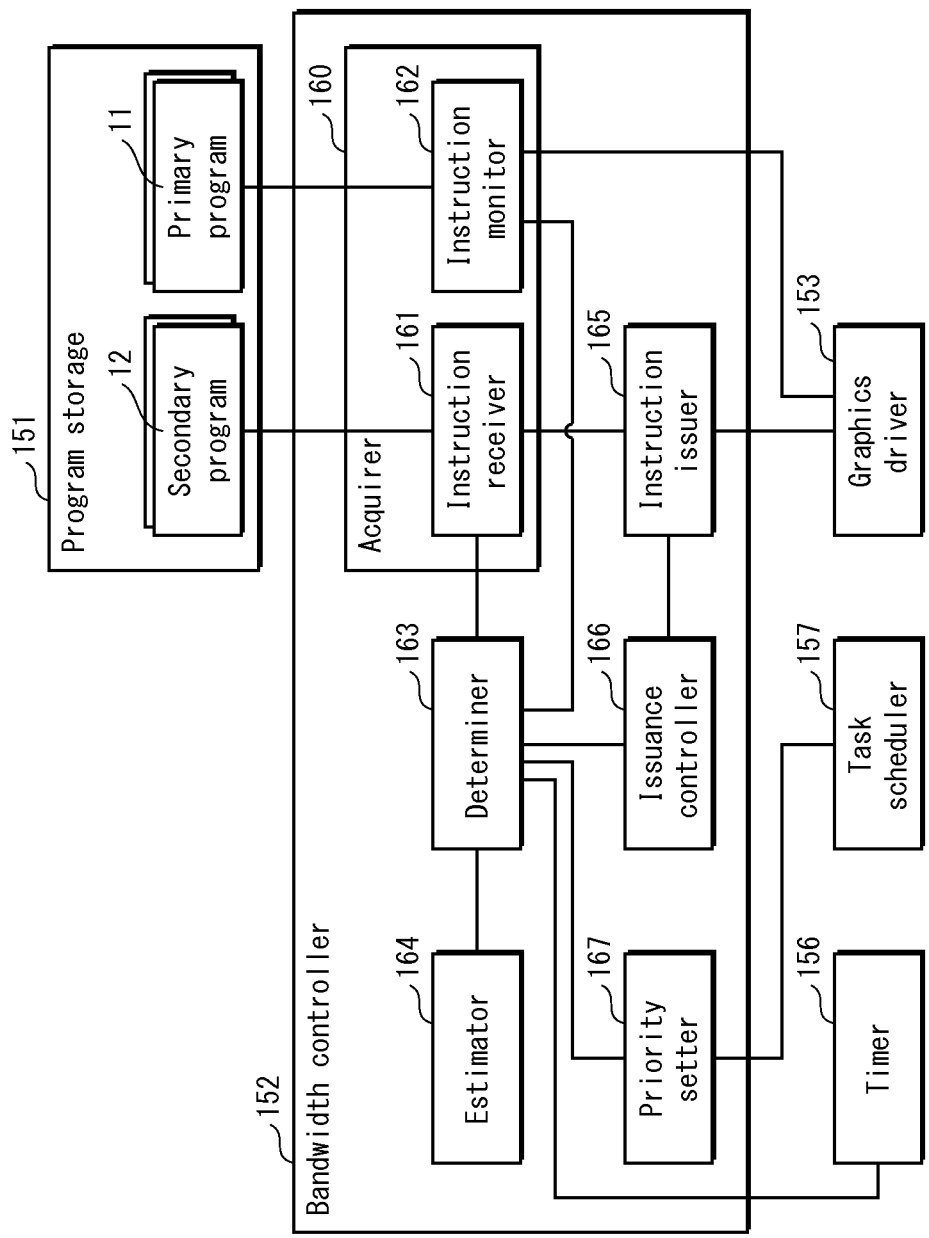
FIG. 5 is a block diagram illustrating one example of a functional configuration of a bandwidth controller 152.

The bandwidth controller 152 is composed of an acquirer 160, the determiner 163, an estimator 164, an instruction issuer 165, an issuance controller 166, and the priority setter 167, as illustrated in FIG. 5. The acquirer 160 includes an instruction receiver 161 and an instruction monitor 162.

The bandwidth controller 152, in order to favorably maintain display performance of graphics due to a drawing instruction of the primary program 11 requiring immediate display, changes priority of CPU processing or delays issuance of drawing instructions with respect to a drawing instruction of the secondary program 12 while monitoring the status of drawing processing according to a drawing instruction of the primary program 11. Monitoring of the status of drawing processing is performed, for example, every frame display time unit (time unit corresponding to the frame rate) when drawing of the frame buffer 155 is updated.

The bandwidth controller 152 monitors during the frame display unit time so as to perform drawing processing of the secondary program 12 within a remaining processing time. The remaining processing time is calculated by subtracting a required CPU processing time and GPU processing time from a total processing time. Here, the required CPU processing time and GPU processing time is for completing drawing image data for a single frame in the frame buffer 155, based on a drawing instruction of the primary program 11, and the total processing time is a total time that can be used within a given frame display unit time (typically, a reciprocal of the frame rate is used, i.e. 1/60 of a second) to complete drawing processing of the primary program 11 of a single frame in the given frame display unit time.

(1) Instruction monitor 162

The instruction monitor 162 receives a primary drawing instruction from the primary program 11. Subsequently, the instruction monitor 162 outputs said primary drawing instruction to the determiner 163, and requests adjustment of processing order of the secondary drawing instruction of the secondary program 12. Subsequently, the instruction monitor 162 outputs said primary drawing instruction to the graphics driver 153.

(2) Instruction Receiver 161

The instruction receiver 161 receives a secondary drawing instruction from the secondary program 12. Subsequently, the instruction receiver 161 outputs said secondary drawing instruction to the determiner 163, and requests adjustment of processing order of the primary drawing instruction of the primary program 11. Subsequently, the instruction receiver 161 outputs said secondary drawing instruction to the instruction issuer 165.

(3) Determiner 163

The determiner 163 determines which of the primary drawing instruction and the secondary drawing instruction is to be executed first by using an estimated CPU processing time or estimated GPU processing time calculated as indicated below.

The determiner 163 has a processing parameter table 200 as illustrated in FIG. 9 and a processing determination table 300 as illustrated in FIG. 10.

Processing Parameter Table 200

FIG. 9 is a diagram illustrating one example of a data structure of the processing parameter table 200.

The processing parameter table 200, as illustrated in FIG. 9, as one example, includes a cumulative CPUGPU processing time 210, a cumulative GPU processing time 211, a primary program estimated CPU processing time 212, a primary program estimated GPU processing time 213, a primary program processing start time 214, a secondary program estimated CPU processing time 215, a secondary program estimated GPU processing time 216, a secondary program processing start time 217, . . . , an estimated remaining CPU processing time 218, an estimated remaining GPU processing time 219, and a current time 220.

Note that in a case in which the number of programs for displaying graphics on the graphics display processing device 100 is increased, the processing parameter table 200 may include a program estimated GPU processing time, a program estimated GPU processing time, and a program processing start time corresponding to each of such programs.

The cumulative CPUGPU processing time 210 stores a total value of CPU processing time and GPU processing time used for drawing processing due to the secondary program 12 from a monitoring start and within a frame display unit time that is subject to said monitoring.

The cumulative GPU processing time 211 stores a total value of GPU processing time used for drawing processing due to the secondary program 12 from a monitoring start and within a frame display unit time that is subject to said monitoring.

The primary program estimated CPU processing time 212 stores a time estimated to be required for processing by the CPU 120 of the primary drawing instruction outputted by the primary program 11.

The primary program estimated GPU processing time 213 stores a time estimated to be required for processing by the GPU 122 of GPU instructions based on the primary drawing instruction outputted by the primary program 11.

The primary program processing start time 214 stores a time at which execution is started based on the primary drawing instruction outputted from the primary program 11.

The secondary program estimated CPU processing time 215 stores a time estimated to be required for processing by the CPU 120 of the secondary drawing instruction outputted by the secondary program 12.

The secondary program estimated GPU processing time 216 stores a time estimated to be required for processing by the GPU 122 of GPU instructions based on the secondary drawing instruction outputted by the secondary program 12.

The secondary program processing start time 217 stores a time at which execution is started based on the secondary drawing instruction outputted from the secondary program 12. Note that when the secondary drawing instruction of the secondary program 12 is delayed, the secondary program processing start time 217 stores "0" until processing is resumed.

The estimated remaining CPU processing time 218 stores a time estimated to be required from the current time until the CPU 120 completes execution of the primary drawing instruction of the primary program 11 when the primary program 11 is being executed.

The estimated remaining GPU processing time 219 stores a time estimated to be required from the current time until the GPU 122 completes execution of GPU drawing instructions corresponding to GPU instructions based on the primary drawing instruction of the primary program 11 when the primary program 11 is being executed.

The current time 220 temporarily stores a current time acquired from the timer 156.

Processing Determination Table 300

FIG. 10 is a diagram illustrating one example of a data structure of the processing determination table 300.

The processing determination table 300, as illustrated in FIG. 10, as one example, includes a monitoring period 310, a CPUGPU processing time limit 311, a GPU processing time limit 312, a CPUGPU processing priority time 313, and a GPU processing priority time 314.

The monitoring period 310 is set to be a period of monitoring by the bandwidth controller 152, or in other words a frame display unit time. For example, the monitoring period 310 may be set as 1/60 of a second. 1/60 of a second corresponds to a drawing period of the display device.

The CPUGPU processing time limit 311 is set to be a total value of CPU processing time and GPU processing time that can be used for drawing processing by the secondary program 12 in the monitoring period 310. For example, the CPUGPU processing time limit 311 may be set by subtracting a CPU processing time, GPU processing time, and an additional time margin required for drawing processing of a single frame by the primary program 11 from a value obtained by multiplying the monitoring period 310 by an inherent ratio specific to the graphics display processing device 100.

(CPUGPU processing time limit 311)=(monitoring period 310×inherent ratio)−(CPU processing time)−(GPU processing time)−(time margin)

The GPU processing time limit 312 is set to be a total value of GPU processing time that can be used for drawing processing by the secondary program 12 in the monitoring period 310. For example, the GPU processing time limit 312 may be set by subtracting a GPU processing time and an additional time margin required for drawing processing of one screen by the primary program 11 from a value obtained by multiplying the monitoring period 310 by an inherent ratio specific to the graphics display processing device 100.

(GPU processing time limit 312)=(monitoring period
  310×inherent ratio)−(GPU processing time)−
  (time margin)

Note that a processing time limit may also be referred to as limit value.

The CPUGPU processing priority time 313 is set to be a primary threshold value. The primary threshold value is compared with a total value of CPU processing time and GPU processing time required for execution of one primary drawing instruction outputted from the primary program 11. In a case in which said total value is less than the primary threshold value, even when the secondary drawing instruction of the secondary program 12 is queued for execution, the primary drawing instruction of the primary program 11 is executed before the secondary drawing instruction of the secondary program 12 to prevent delay of drawing processing of the primary program 11 caused by dependencies between drawing instructions.

The GPU processing priority time 314 is set to be a secondary threshold value. The secondary threshold value is compared with GPU processing time required for execution of one primary drawing instruction outputted from the primary program 11. In a case in which said GPU processing time is less than the secondary threshold value, even when the secondary drawing instruction of the secondary program 12 is queued for execution, the primary drawing instruction of the primary program 11 is executed before the secondary drawing instruction of the secondary program 12 to prevent delay of drawing processing of the primary program 11 caused by dependencies between drawing instructions.

Note that each processing priority time may also be referred to as a priority threshold value.

Function of Determiner 163

The determiner 163 receives drawing instructions from each of the instruction monitor 162 and the instruction receiver 161. When the determiner 163 receives drawing instructions, the determiner 163 outputs each drawing instruction to the estimator 164. Subsequently, the determiner 163 queries the estimator 164 for an estimated processing time of processing by the CPU 120 and an estimated processing time of processing by the GPU 122 for each drawing instruction.

Subsequently, the determiner 163 receives, from the estimator 164, an estimated processing time of processing by the CPU 120 and an estimated processing time of processing by the GPU 122 for each drawing instruction. The determiner 163 writes, to the processing parameter table 200, an estimated processing time of processing by the CPU 120 for a drawing instruction from the instruction monitor 162 as the primary program estimated CPU processing time 212. Further, the determiner 163 writes, to the processing parameter table 200, an estimated processing time of processing by the GPU 122 for said drawing instruction from the instruction monitor 162 as the primary program estimated GPU processing time 213. Further, the determiner 163 writes, to the processing parameter table 200, an estimated processing time of processing by the CPU 120 for said drawing instruction from the instruction receiver 161 as the secondary program estimated CPU processing time 215. Further, the determiner 163 writes, to the processing parameter table 200, an estimated processing time of processing by the GPU 122 for said drawing instruction from the instruction receiver 161 as the secondary program estimated GPU processing time 216.

When the determiner 163 receives a drawing instruction from the instruction monitor 162, the determiner 163 queries the timer 156 for the current time. Subsequently, the determiner 163 receives the current time from the timer 156. Subsequently, the determiner 163 writes the current time to the processing parameter table 200 as the current time 220.

The determiner 163 determines, according to each estimated processing time of a drawing instruction and by using the processing determination table 300, whether a drawing instruction from the secondary program 12 should be executed or postponed. Subsequently, the determiner 163 notifies the issuance controller 166 of a result of said determination.

The determiner 163, when receiving the primary drawing instruction of the primary program 11 from the instruction monitor 162, indicates to the priority setter 167 that drawing processing of the primary drawing instruction, executed by the CPU 120, is to be processed before drawing processing of the secondary drawing instruction of the secondary program 12, executed by the CPU 120.

(4) Estimator 164

The estimator 164 calculates an estimated CPU processing time required for processing by the CPU 120 due to execution of the primary drawing instruction or the second drawing instruction, as shown below. Further, the estimator 164 calculates an estimated GPU processing time required for drawing processing by the GPU 122 due to execution of GPU instructions generated based on the primary drawing instruction or the secondary drawing instruction.

FIG. 11 is a diagram illustrating one example of a data structure of the estimated processing time table 400.

The estimator 164, as one example, stores the estimated processing time table 400 illustrated in FIG. 11. As illustrated, the estimated processing time table 400 has areas for recording a plurality of pieces of estimated processing time information. Each piece of estimated processing time information includes an instruction classification associated with an estimated CPU processing time and an estimated GPU processing time.

Each instruction classification indicates a classification of a drawing instruction from the primary program 11 or the secondary program 12. The estimator 164 determines which instruction classification to match with a drawing instruction received from the determiner 163.

The estimated CPU processing time is an estimated processing time required for processing a drawing instruction indicated by a corresponding instruction classification in a case in which said drawing instruction is executed by the CPU 120. Units of the estimated CPU processing time may be, as one example, milliseconds.

The estimated GPU processing time is an estimated processing time required for processing GPU instructions corresponding to a drawing instruction indicated by a corresponding instruction classification in a case in which said GPU instructions are executed by the GPU 122. Units of the estimated GPU processing time may be, as one example, milliseconds.

The estimated processing time table 400 includes, as one example, estimated processing time information 413 as illustrated in FIG. 11. The estimated processing time information 413 includes an instruction classification 410 "1A", an estimated CPU processing time 411 "1", and an estimated GPU processing time 412 "1". The estimated processing time information 413 indicates that when the drawing instruction indicated by "1A" is executed on the CPU 120, "1 millisecond" is estimated to be required. Further, the estimated processing time information 413 indicates that when the GPU instructions based on the drawing instruction indicated by "1A" are executed on the GPU 122, "1 millisecond" is estimated to be required.

Note that in a case in which variation in processing time is large due to parameters of a drawing instruction, each piece of estimated processing time information of the estimated processing time table 400 may include, instead of an estimated CPU processing time and an estimated GPU processing time, a function calculating an estimated CPU processing time and a function calculating an estimated GPU processing time, associated with an instruction classification. Each function is a function for calculating an estimated processing time using a parameter of a drawing instruction.

The estimator 164 receives a drawing instruction from the determiner 163. When the estimator 164 receives a drawing instruction, the estimator searches the estimated processing time table 400 for an instruction classification matching said drawing instruction. Subsequently, the estimator 164 reads, from the estimated processing time table 400, an estimated CPU processing time and an estimated GPU processing time corresponding to an instruction classification that matches said drawing instruction. In this way, the estimator 164, using the estimated processing time table 400, calculates an estimated CPU processing time required for processing said drawing instruction by the CPU 120. Further, the estimator 164, using the estimated processing time table 400, calculates an estimated GPU processing time required for processing said drawing instruction by the GPU 122.

Subsequently, the estimator 164 outputs said estimated CPU processing time and said estimated GPU processing time to the determiner 163.

(5) Instruction Issuer 165

The instruction issuer 165 issues a drawing instruction according to a control by the issuance controller 166.

The instruction issuer 165 receives a drawing instruction from the instruction receiver 161. Subsequently, the instruction issuer 165 outputs said drawing instruction to the issuance controller 166 and queries the issuance controller to determine whether said drawing instruction should be executed or postponed.

The instruction issuer 165 receives a continuation instruction from the issuance controller 166 indicating that issuance of a drawing instruction is to continue. When the instruction issuer 165 receives a continuation instruction, the instruction issuer 165 issues said drawing instruction to the graphics driver 153.

(6) Issuance Controller 166

The issuance controller 166, in a case in which it is determined that the primary drawing instruction is to be executed first, causes the primary drawing instruction to be executed and execution of the secondary drawing instruction to be postponed.

FIG. 12 is a diagram illustrating one example of a data structure of the timing parameter table 500.

The issuance controller 166, as one example, stores the timing parameter table 500 illustrated in FIG. 12.

The timing parameter table 500 includes, as illustrated, an issuance postponement request flag 510 and an issuance postponement instruction presence flag 511.

The issuance postponement request flag 510 has one of two values: a set status and a reset status. Said set status indicates that a drawing instruction to be issued next is to be postponed. Said reset status indicates that a drawing instruction to be issued next is to be issued immediately.

The issuance postponement request flag 510 used for determining whether a drawing instruction to be issued next is to be postponed or issued immediately.

The issuance postponement instruction presence flag 511 has one of two values: a set status and a reset status. Said set status indicates that an active issuance postponement instruction is present in the instruction issuer 165. Said reset status indicates that an active issuance postponement instruction is not present in the instruction issuer 165.

The issuance postponement instruction presence flag 511 is used for determining whether or not an active issuance postponement instruction is present in the instruction issuer 165.

The issuance controller 166 receives from the instruction issuer 165 a query to determine whether a drawing instruction is to be executed or postponed.

The issuance controller 166, in response to said query from the instruction issuer 165 and based on a value of the issuance postponement request flag 510, notifies the instruction issuer 165 whether said drawing instruction is to be postponed or issuance of said drawing instruction is to continue. Note that details of operation of the issuance controller 166 are described later.

(7) Priority Setter 167

The priority setter 167 sets, with respect to the task scheduler 157, a priority whereby a processing priority of the primary drawing instruction from the primary program 11 is higher than a processing priority of the secondary drawing instruction from the secondary program 12.

1.6 Operation of Graphics Display Processing Device 100

Operation of the graphics display processing device 100 is described herein.

(1) Operation of the Determiner 163 when the Secondary Drawing Instruction of the Secondary Program 12 is Received.

Figure 13:
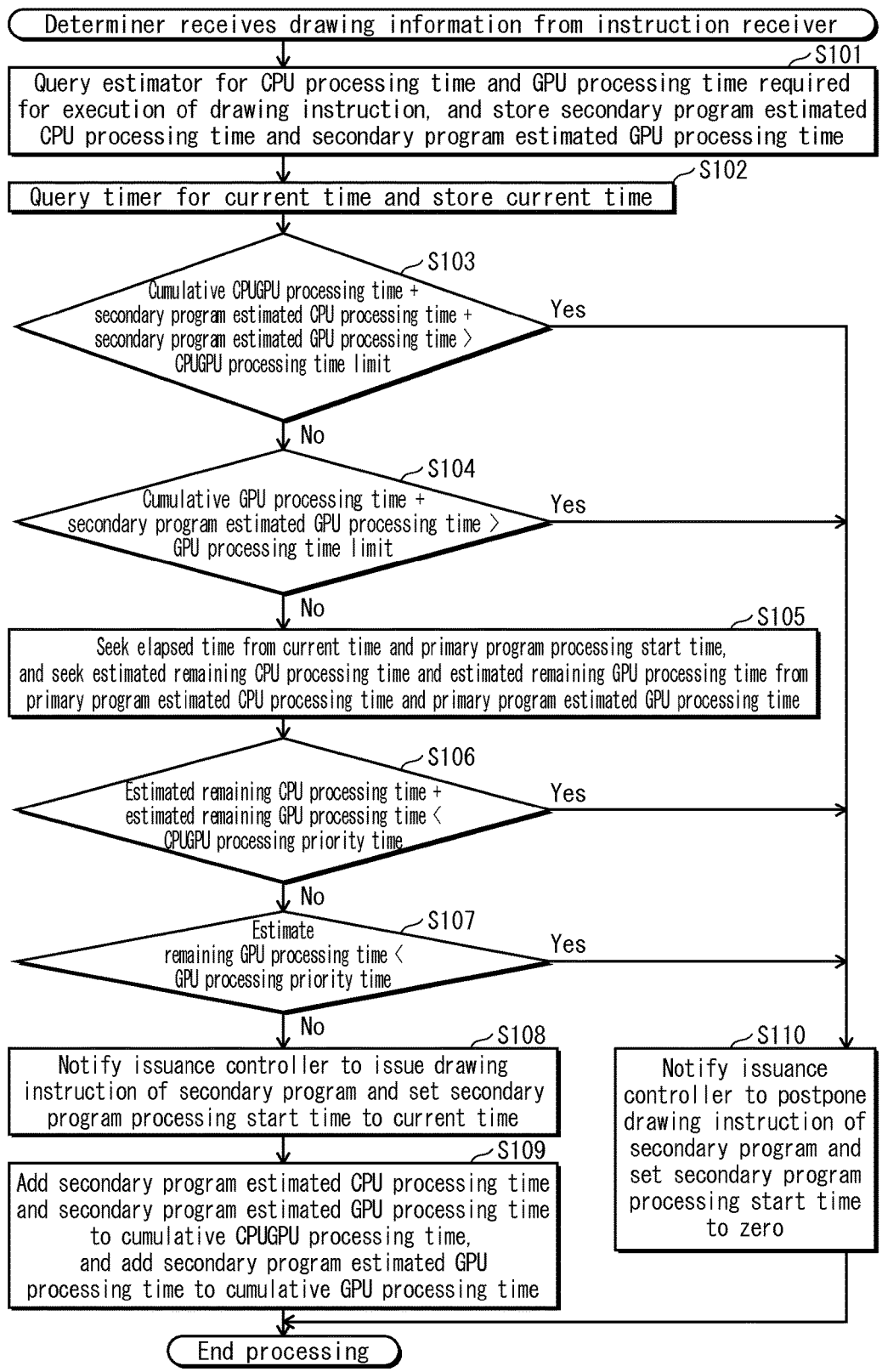
FIG. 13 is a flowchart illustrating one example of operation of a determiner 163 in a case in which a drawing instruction is received from an instruction receiver 161.

FIG. 13 is a flowchart illustrating one example of operation of the determiner 163 in a case in which a drawing instruction is received from the instruction receiver 161.

Operation of the determiner 163 when the secondary drawing instruction of the secondary program 12 is received from the instruction receiver 161 is described using the flowchart illustrated in FIG. 13.

Upon receiving the secondary drawing instruction of the secondary program 12, when the secondary drawing instruction is to be executed, the determiner 163 causes the estimator 164 to calculate an estimated processing time required for processing by the CPU 120 and an estimated processing time for processing by the GPU 122. The determiner 163 receives each estimated processing time from the estimator 164. Subsequently, the determiner 163 writes each estimated processing time to the processing parameter table 200 as the secondary program estimated CPU processing time 215 and the secondary program estimated GPU processing time 216 (step S101).

Subsequently, the determiner 163 queries the timer 156 for the current time, and writes the current time to the processing parameter table 200 as the current time 220 (step S102).

The determiner 163 determines whether a value obtained by summing the cumulative CPUGPU processing time 210, the secondary program estimated CPU processing time 215, and the secondary program estimated GPU processing time 216 is greater than the CPUGPU processing time limit 311 (step S103). As a result of said determination, when said summed value is greater than the CPUGPU processing time limit 311 ("Yes" at step S103), processing by the determiner 163 proceeds to step S110.

When said summed value is less than or equal to the CPUGPU processing time limit 311 ("No" at step S103), the determiner 163 determines whether a value obtained by summing the cumulative GPU processing time 211 and the secondary program estimated GPU processing time 216 is greater than the GPU processing time limit 312 (step S104). As a result of said determination, when said summed value is greater than the GPU processing time limit 312 ("Yes" at step S104), processing by the determiner 163 proceeds to step S110.

When said summed value is less than or equal to the GPU processing time limit 312 ("No" at step S104), the determiner 163 calculates the estimated remaining CPU processing time 218 and the estimated remaining GPU processing time by using the current time 220, the primary program processing start time 214, the primary program estimated CPU processing time 212, and the primary program estimated GPU processing time 213, as shown below.

The determiner 163 calculates the estimated remaining CPU processing time 218 as being: primary program estimated CPU processing time 212−(current time 220−primary program processing start time 214). When said calculated value is not greater than zero, the estimated remaining CPU processing time 218 is set as zero.

Estimated remaining CPU processing time 218=primary program estimated CPU processing time 212−(current time 220−primary program processing start time 214)

Further, estimated remaining CPU processing time 218=0 (when estimated remaining CPU processing time 218 is calculated to not be greater than zero)

When the estimated remaining CPU processing time 218 is calculated be greater than zero, the determiner 163 sets the estimated remaining GPU processing time 219 to be equal to the primary program estimated GPU processing time 213.

Estimated remaining GPU processing time 219=primary program estimated GPU processing time 213 (when estimated remaining CPU processing time 218 is greater than zero)

When the estimated remaining CPU processing time 218 is zero, the determiner 163 sets the estimated remaining GPU processing time 219 as the result of: primary program estimated GPU processing time 213+primary program estimated CPU processing time 212−(current time 220−primary program processing start time 214). When the estimated remaining GPU processing time 219 is calculated to not be greater than zero, the estimated remaining GPU processing time 219 is set as zero.

Estimated remaining GPU processing time 219=primary program estimated GPU processing time 213+primary program estimated CPU processing time 212−(current time 220−primary program processing start time 214)(when the estimated remaining CPU processing time 218 is calculated to be zero)

Estimated remaining GPU processing time 219=0 (when the estimated remaining GPU processing time 219 is calculated to not be greater than zero)

Subsequently, the determiner 163 writes the estimated remaining CPU processing time 218 and the estimated remaining GPU processing time 219 to the processing parameter table 200 (step S105).

Subsequently, the determiner 163 determines whether a total value of the estimated remaining CPU processing time 218 and the estimated remaining GPU processing time 219 is less than the CPUGPU processing priority time 313 (step S106). When said total value is less than the CPUGPU processing priority time 313 ("Yes" at step S106), processing by the determiner 163 proceeds to step S110.

When said total value is greater than or equal to the CPUGPU processing priority time 313 ("No" at step S106), the determiner 163 determines whether the estimated remaining GPU processing time 219 is less than the GPU processing priority time 314 (step S107). When the estimated remaining GPU processing time 219 is less than the GPU processing priority time 314 ("Yes" at step S107), processing by the determiner 163 proceeds to step S110. When the estimated remaining GPU processing time 219 is greater than or equal to the GPU processing priority time 314 ("No" at step S107), the determiner notifies the issuance controller 166 to issue the secondary drawing instruction of the secondary program 12, and sets the value of the current time 220 as the secondary program processing start time 217 (step S108).

Subsequently, the determiner 163 adds the secondary program estimated CPU processing time 215 and the secondary program estimated GPU processing time 216 to the cumulative CPUGPU processing time 210. Further, the determiner 163 adds the secondary program estimated GPU processing time 216 to the cumulative GPU processing time 211 (step S109).

In this way, processing by the determiner 163 when the secondary drawing instruction of the secondary program 12 is received is completed.

The determiner 163 notifies the issuance controller 166 to postpone drawing processing of the secondary program 12, and sets the secondary program processing start time 217 to zero (step S110) in any of the following cases: when the value of the sum of the cumulative CPUGPU processing time 210, the secondary program estimated CPU processing time 215, and the secondary program estimated GPU processing time 216 is greater than the CPUGPU processing time limit 311 ("Yes" at step 103); when the value of the sum of the cumulative GPU processing time 211 and the secondary program estimated GPU processing time 216 is greater than the GPU processing time limit 312 ("Yes" at step S104); when the total value of the estimated remaining CPU processing time 218 and the estimated remaining GPU processing time 219 is less than the CPUGPU processing time limit 313 ("Yes" at step S106); and when the estimated remaining GPU processing time 219 is less than the GPU processing priority time 314, ("Yes" at step S107).

In this way, processing by the determiner 163 when the secondary drawing instruction of the secondary program 12 is received is completed.

Note that in step S109, the value of the sum of the cumulative CPUGPU processing time 210 and the cumulative GPU processing time 211 may be measured and the actual time taken for processing may be used without using estimation.

Figure 14:
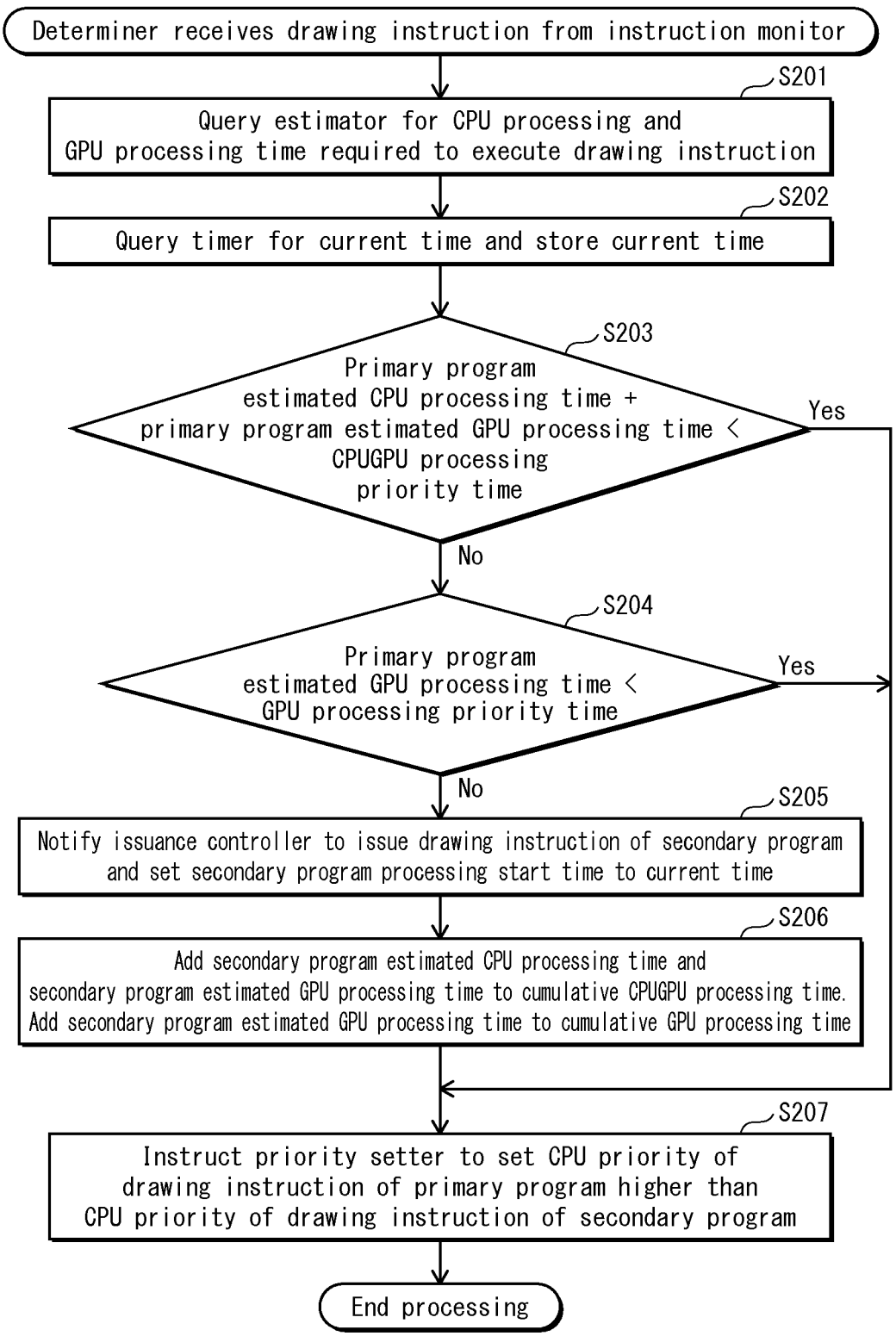
FIG. 14 is a flowchart illustrating one example of operation of the determiner 163 in a case in which a drawing instruction is received from an instruction monitor 161.

(2) Operation of the Determiner 163 when the Primary Drawing Instruction of the Primary Program 11 is Received FIG. 14 is a flowchart illustrating one example of operation of the determiner 163 in a case in which a drawing instruction is received from the instruction monitor 162.

Operation of the determiner 163 when the primary drawing instruction of the primary program 11 is received from the instruction monitor 162 is described using the flowchart illustrated in FIG. 14.

Upon receiving the primary drawing instruction of the primary program 11, when the primary drawing instruction is to be executed, the determiner 163 causes the estimator 164 to calculate an estimated processing time required for processing by the CPU 120 and an estimated processing time for processing by the GPU 122. The determiner 163 receives each estimated processing time from the estimator 164. Subsequently, the determiner 163 writes each estimated processing time to the processing parameter table 200 as the primary program estimated CPU processing time 212 and the primary program estimated GPU processing time 213 (step S201).

The determiner 163 queries the timer 156 for the current time, and stores the current time as the current time 220 (step S202).

Subsequently, the determiner 163 determines whether a total value of the primary program estimated CPU processing time 212 and the primary program estimated GPU processing time 213 is less than the CPUGPU processing priority time 313 (step S203). When said total value is less than the CPUGPU processing priority time 313 ("Yes" at step S203), processing by the determiner 163 proceeds to step S207.

When said total value is greater than or equal to the CPUGPU processing priority time 313 ("No" at step S203), the determiner 163 determines whether the primary program estimated GPU processing time 213 is less than the GPU processing priority time 314 (step S204). When the primary program estimated GPU processing time 213 is less than the GPU processing priority time 314 ("Yes" at step S204), processing by the determiner 163 proceeds to step S207.

When the primary program estimated GPU processing time 213 is greater than or equal to the GPU processing priority time 314 ("No" at step S204), the determiner 163 notifies the issuance controller 166 to issue the secondary drawing instruction of the secondary program 12 and sets the secondary program processing start time 217 to the value of the current time 220 (step S205). In this way, the secondary drawing instruction of the secondary program 12 is issued from the instruction issuer 165 to the graphics driver 153.

Subsequently, the determiner 163 adds the secondary program estimated CPU processing time 215 and the secondary program estimated GPU processing time 216 to the cumulative CPUGPU processing time 210. The determiner 163 adds the secondary program estimated GPU processing time 216 to the cumulative GPU processing time 211 (step S206).

Subsequently, the determiner 163 instructs the priority setter 167 to adjust CPU priority of the primary drawing instruction of the primary program 11 to be higher than CPU priority of the secondary drawing instruction of the secondary program 12 (step S207).

Note that the processing indicated in step S207 need not be executed every time as long as no change in CPU processing priority has occurred in the primary program 11 and the secondary program 12.

Figure 15:
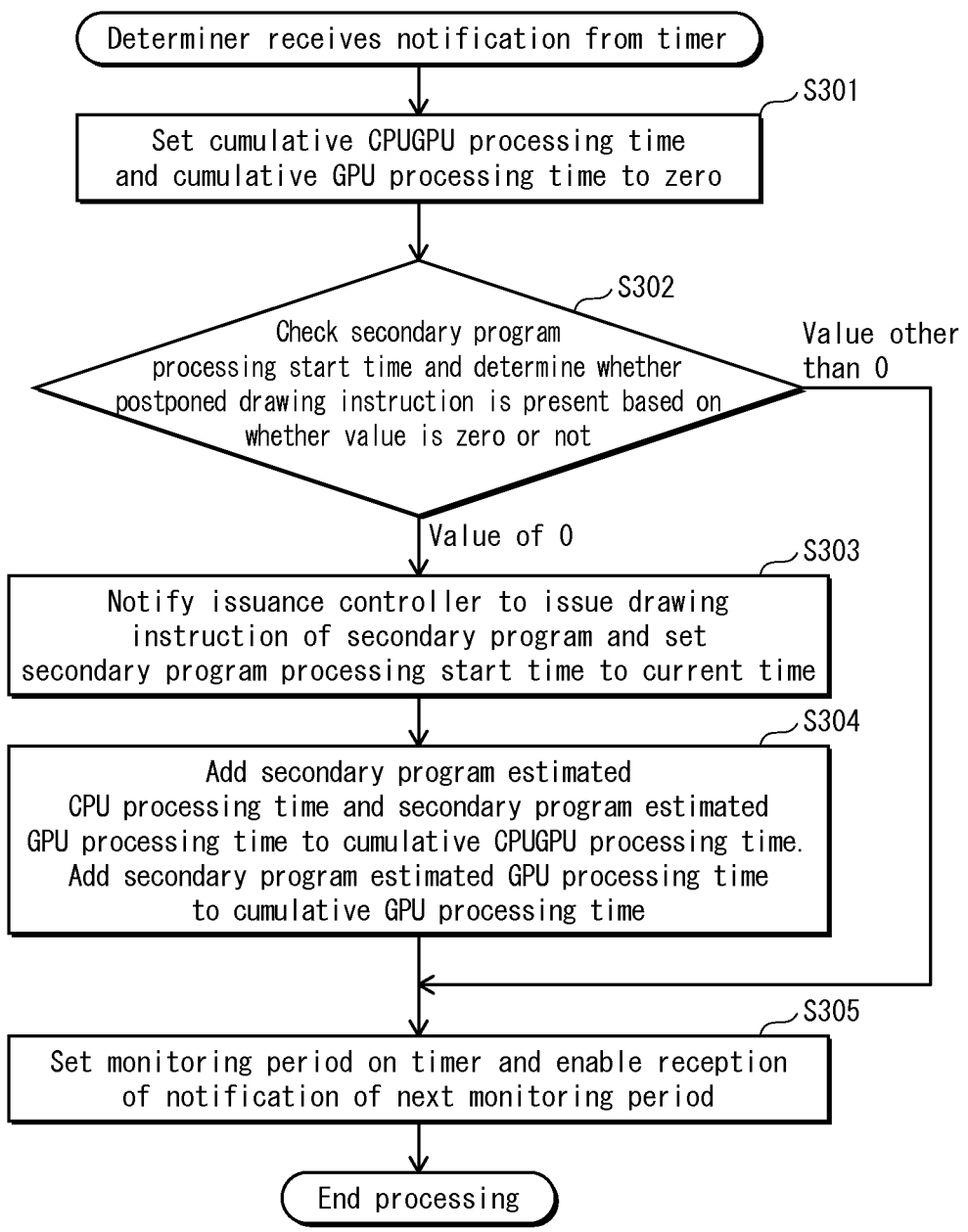
FIG. 15 is a flowchart illustrating one example of operation of the determiner 163 in a case in which a notification is received from a timer 156.

(3) Operation of the Determiner 163 Upon Receiving a Notification of the End of a Monitoring Period FIG. 15 is a flowchart illustrating one example of operation of the determiner 163 in a case in which a notification is received from the timer 156.

Operation of the determiner 163 in a case in which a notification of the end of a monitoring period is received from the timer 156 is described using the flowchart illustrated in FIG. 15.

Upon receiving a notification of the end of a monitoring period from the timer 156, the determiner 163 sets the cumulative CPUGPU processing time 210 and the cumulative GPU processing time 211 to "0" (step S301).

Subsequently, the determiner 163 determines whether or not the secondary drawing instruction from the secondary program 12 is in a postponed state, by determining whether or not the secondary program processing start time 217 has a value of "0" (step S302). When the secondary program processing start time 217 has a value other than "0" ("Value other than 0" at step S302), the determiner 163 determines that the secondary drawing instruction in a postponed state is not present, and processing proceeds to step S305.

When the secondary program processing start time 217 has a value of "0" (Value of "0" at step S302), the determiner 163 determines that the secondary drawing instruction in a postponed state is present, notifies the issuance controller 166 to issue the secondary drawing instruction of the secondary program 12, and sets the secondary program processing start time 217 to the value of the current time 220 (step S303).

Subsequently, the determiner 163 adds the secondary program estimated CPU processing time 215 and the secondary program estimated GPU processing time 216 to the cumulative CPUGPU processing time 210. Further, the determiner 163 adds the secondary program estimated GPU processing time 216 to the cumulative GPU processing time 211 (step S304).

Subsequently, the determiner 163 sets the monitoring period 310 on the timer 156, in order that a notification of the end of the next monitoring period can be received (step S305).

(4) Operation of Issuance Controller 166

Figure 16:
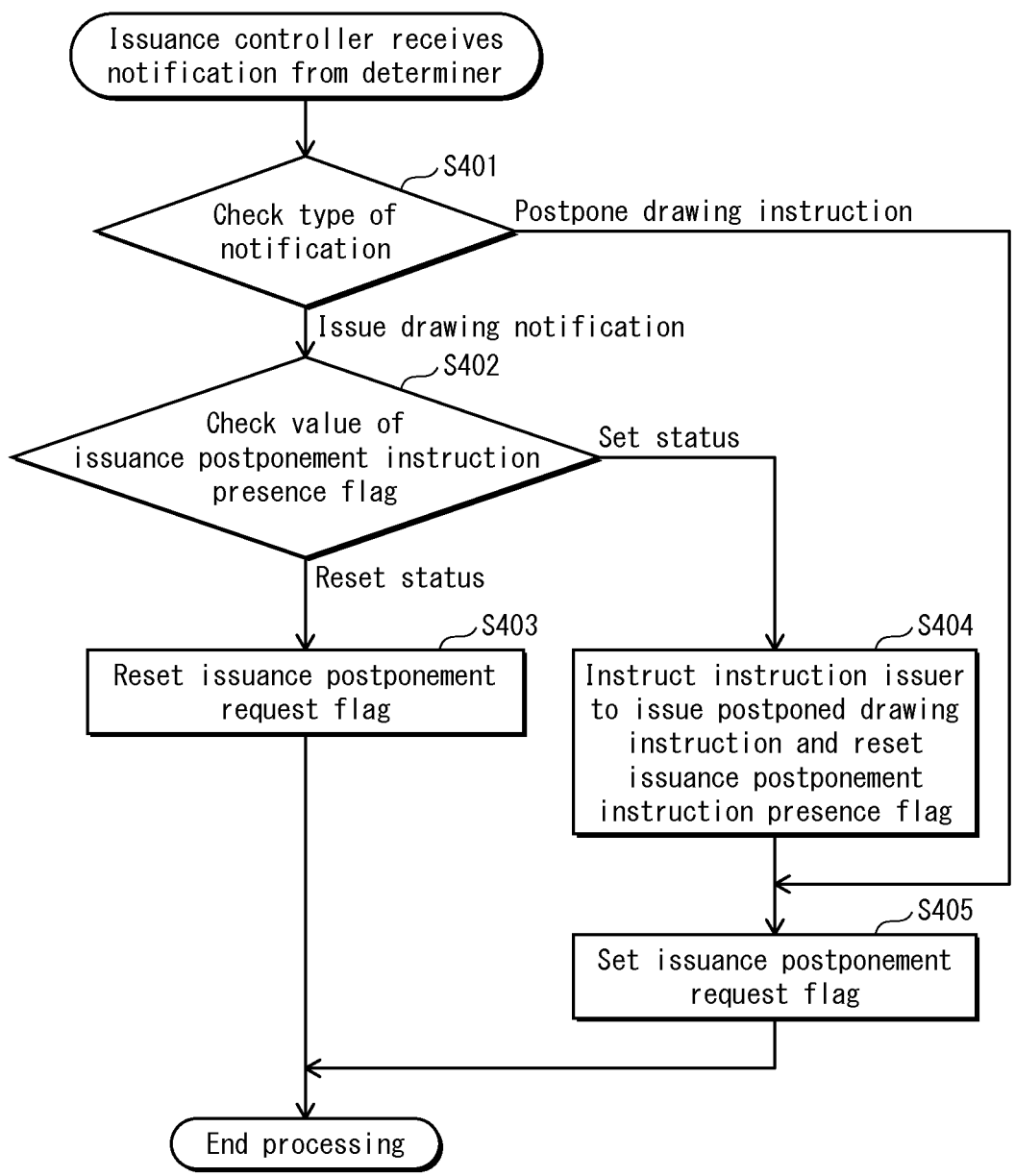
FIG. 16 is a flowchart illustrating one example of operation of an issuance controller 166 in a case in which a notification is received from the determiner 163.

FIG. 16 is a flowchart illustrating one example of operation of the issuance controller 166 in a case in which a notification is received from the determiner 163.

Operation of the issuance controller 166 in a case in which a notification of postponement or continuation of issuing of a drawing instruction is received from the determiner 163 is described using the flowchart illustrated in FIG. 16.

Upon receiving a notification from the determiner 163, the issuance controller 166 determines the type of notification (step S401). Notifications are one of postponement of a drawing instruction and continuance of issuing of a drawing instruction. When the notification is for postponement of a drawing instruction ("Postponement of drawing instruction" at step S401), processing by the issuance controller 166 proceeds to step S405.

When the notification is for continuance of issuing of a drawing instruction ("Continuance of issuing of drawing instruction" at step S401), the issuance controller 166 checks the value of the issuance postponement instruction presence flag 511 to determine whether or not a drawing instruction in a postponed state is present at the instruction issuer 165 (step S402).

When the value of issuance postponement instruction presence flag 511 is the reset status ("Reset status" at step S402), the issuance controller 166 determines that a postponed drawing instruction is not present, resets the issuance postponement request flag 510, and causes issuing of a next drawing instruction by the secondary program 12 to be allowed immediately (step S403). In this way, processing is completed.

When the value of the issuance postponement instruction presence flag 511 is the set status ("Set status" at step S402), a postponed drawing instruction is present, the issuance controller 166 notifies the instruction issuer 165 to issue the postponed drawing instruction and resets the issuance postponement instruction presence flag 511 (step S404). In this way, the instruction issuer 165 issues the postponed drawing instruction. Subsequently, the issuance controller 166 sets the issuance postponement request flag 510 in order to cause postponement of a drawing instruction to be issued next (step S405). In this way, processing is completed.

(5) Operation of Issuance Controller 166

Figure 17:
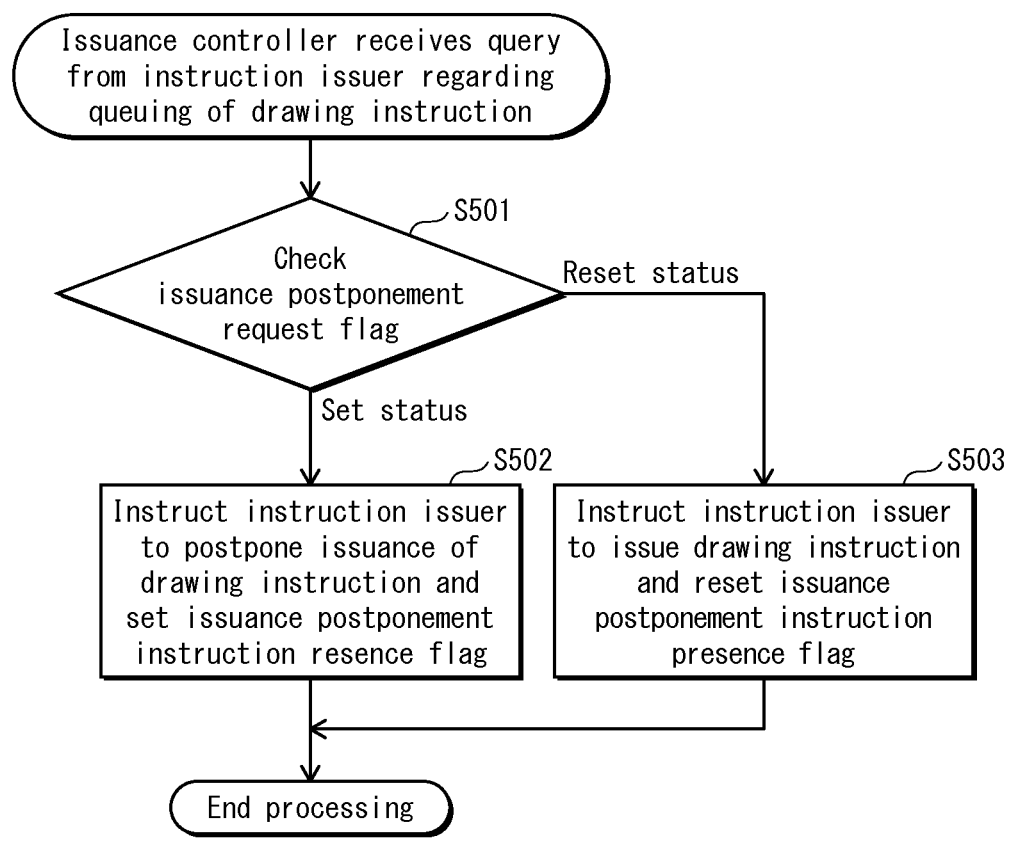
FIG. 17 is a flowchart illustrating one example of operation of the issuance controller 166 in a case in which a query regarding postponement of issuance of drawing instructions is received from an instruction issuer 165.

FIG. 17 is a flowchart illustrating one example of operation of the issuance controller 166 in a case in which a query regarding queuing of issuance of drawing instructions is received from the instruction issuer 165.

Operation of the issuance controller 166 in a case in which a query regarding queuing of issuance of drawing instructions is received from the instruction issuer 165 is described using the flowchart illustrated in FIG. 17.

Upon receiving a query regarding queuing of issuance of a drawing instruction from the instruction issuer 165, the issuance controller 166 checks the issuance postponement request flag 510 (step S501).

When the issuance postponement request flag 510 is in the set status ("Set status" at step S501), the issuance controller 166 notifies the instruction issuer 165 to postpone issuing of said drawing instruction and sets the issuance postponement instruction presence flag 511 (step S502). In this way, processing is completed.

When the issuance postponement request flag 510 is in the reset status ("Reset status" at step S501), the issuance controller 166 notifies the instruction issuer 165 to issue said drawing instruction and resets the issuance postponement instruction presence flag 511 (step S503). In this way, processing is completed.

1.7 Description of Effects

Effects with respect to immediacy of drawing processing in the present embodiment are described by comparing cases in which the present embodiment is not applied and is applied.

Here, the primary program 11 is a program requiring immediate display, as described above. In other words, the primary program 11 is a program that require completion of display of a single frame within a frame display unit time T0. The frame display unit time T0 is determined by the frame rate. Due to completion of display within the frame display unit time T0, a user is able to obtain appropriate information correctly representing a most recent status.

Further, the secondary program 12 is a program not requiring immediate display.

Here, the primary program 11 includes primary drawing instructions "1A", "1B", and "1C". The primary drawing instructions "1A", "1B", and "1C" are outputted from the primary program 11 in the stated order. The primary drawing instructions "1A", "1 B", and "1C" are executed in the stated order by the CPU 120, or in other words by the graphics driver 153. The graphics driver 153 associates GPU instructions and processing data with corresponding drawing instructions, and stores each drawing instruction in the command queue buffer 15 in the stated order.

The GPU 122, by executing drawing processing corresponding to each GPU instruction by using the processing data, outputs drawing image data that is a result of the drawing processing to the frame buffer 155 (also referred to as drawing to the frame buffer 155).

The GPU 122 executes GPU instructions corresponding to the primary drawing instructions "1A", "1B", and "1C", and when drawing processing is completed, a single frame of the drawing image data of the primary program 11 is completed.

Here, the secondary program 12 includes secondary drawing instructions "2A", "2B", and "2C". The secondary drawing instructions "2A", "2B", and "2C" are outputted from the secondary program 12 in the stated order. The secondary drawing instructions "2A", "2B", and "2C" are executed in the stated order by the CPU 120, or in other words by the graphics driver 153. The graphics driver 153 associates GPU instructions and processing data with corresponding drawing instructions, and stores each drawing instruction in the command queue buffer 15 in the stated order.

The GPU 122, by executing drawing processing corresponding to each GPU instruction by using the processing data, outputs drawing image data that is a result of the drawing processing to the frame buffer 155.

The GPU 122 executes GPU instructions corresponding to the primary drawing instructions "2A", "2B", and "2C", and when drawing processing is completed, a single frame of the drawing image data of the secondary program 12 is completed.

The display 112 reads and displays drawing image data for a single frame that is stored in the frame buffer 155 at timings based on a frame rate.

(1) Here, the drawing instructions "1A", "1B", "1C", "2A", "2B", and "2C" are considered to be independent of results of previously processed GPU instructions.

Figure 18:
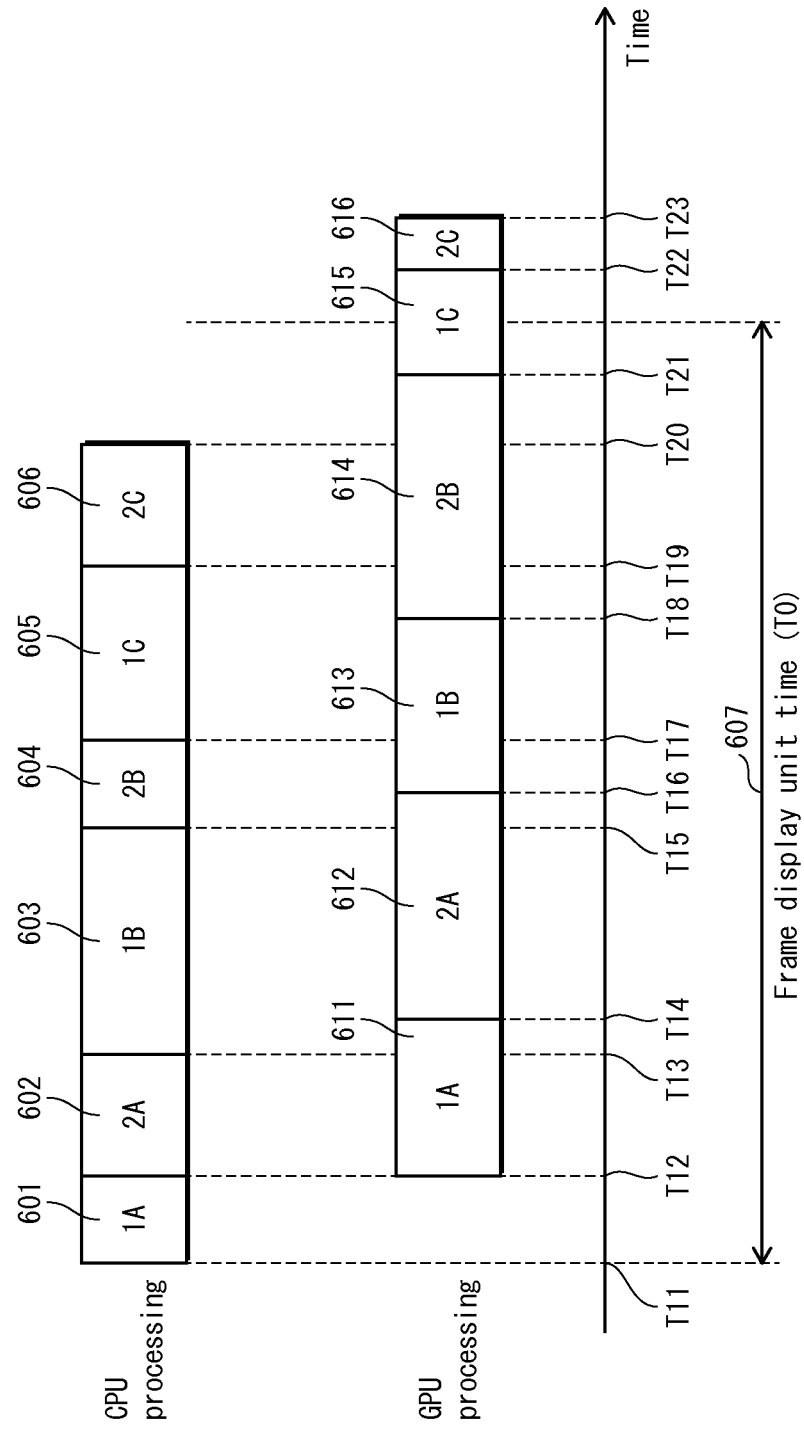
FIG. 18 is a timing chart illustrating one example of CPU drawing processing and GPU drawing processing of each drawing instruction in a case in which techniques disclosed in the embodiment are not applied.

FIG. 18 is a timing chart illustrating one example of CPU drawing processing and GPU drawing processing of each drawing instruction in a case in which techniques disclosed in the embodiment are not applied.

Figure 19:
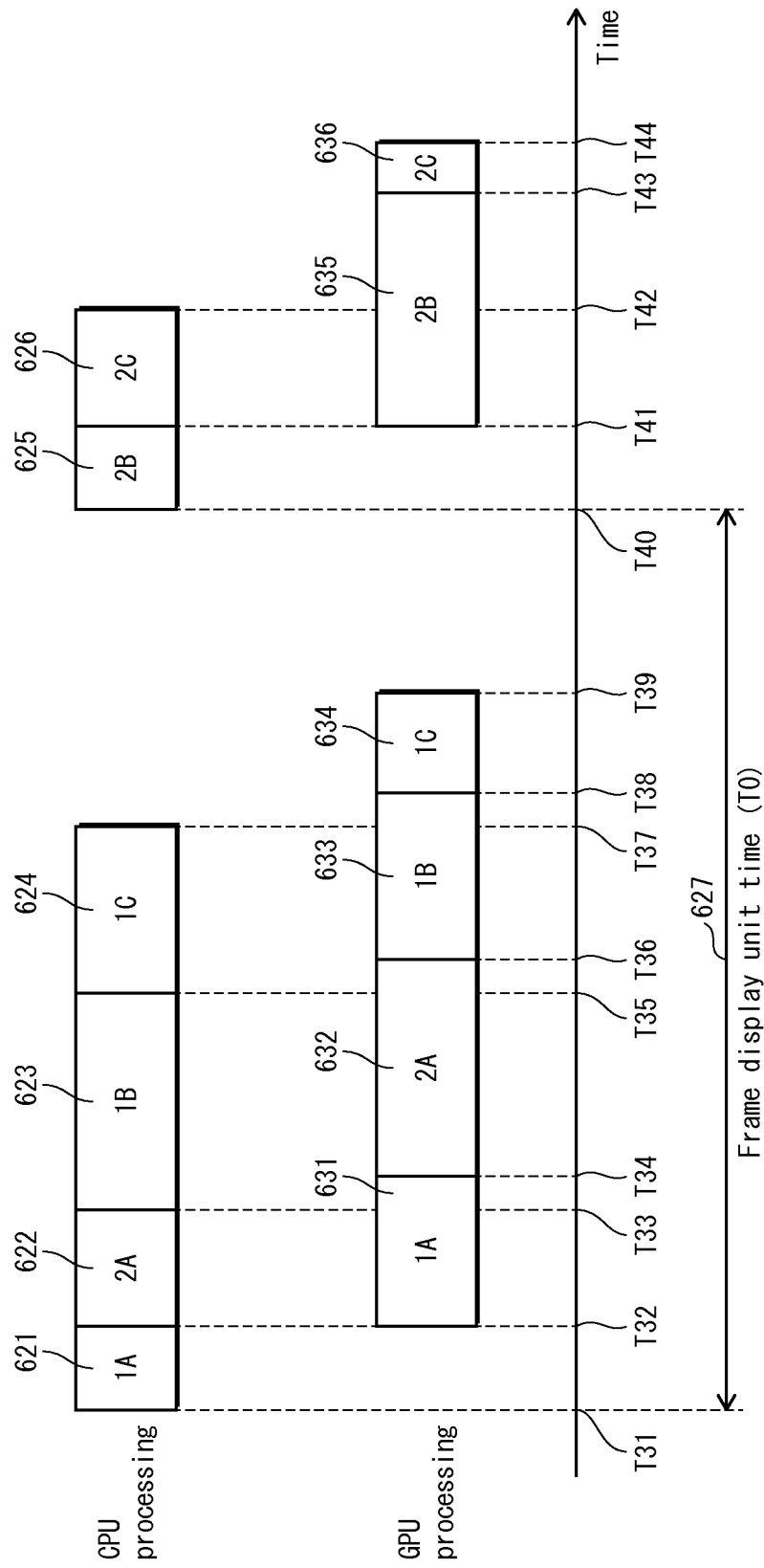
FIG. 19 is a timing chart illustrating one example of CPU drawing processing and GPU drawing processing of each drawing instruction in a case in which techniques disclosed in the embodiment are applied.

FIG. 19 is a timing chart illustrating one example of CPU drawing processing and GPU drawing processing of each drawing instruction in a case in which techniques disclosed in the embodiment are applied.

The primary drawing instructions "1A", "1 B", and "1C" indicated in FIG. 18 correspond to the primary drawing instructions "1A", "1B", and "1C" indicated in FIG. 19. Further, the secondary drawing instructions "2A", "2B", and "2C" indicated in FIG. 18 correspond to the secondary drawing instructions "2A", "2B", and "2C" indicated in FIG. 19.

The instruction monitor 162 receives the primary drawing instructions "1A", "1B", and "1C". Further, The instruction receiver 161 receives the secondary drawing instructions "2A", "2B", and "2C".

The drawing instructions "1A", "2A", "1B", "2B", "1C", and "2C" are received in the stated order over time.

Further, said drawing instructions satisfy one of the following: condition (i) and condition (ii).

(i) The sum of the CPU processing time and the GPU processing time of the secondary drawing instruction "2A" and the estimated CPU processing time and the estimated GPU processing time of the secondary drawing instruction "2B" are greater than the CPUGPU processing time limit 311. Here, the CPU processing time and the GPU processing time of the secondary drawing instruction "2A" are actual measured values measured after completion of execution of the secondary drawing instruction "2A" and GPU instructions based on the secondary drawing instruction "2A".

(ii) The sum of the GPU processing time of the secondary drawing instruction "2A" and the estimated GPU processing time of the secondary drawing instruction "2B" is greater than the GPU processing time limit 312. Here, the GPU processing time of the secondary drawing instruction "2A" is an actual measured value measured after completion of execution of GPU instructions based on the secondary drawing instruction "2A".

Conditions (i) and (ii) indicate that when the secondary drawing instruction "2b" is received, the result of one of S103 and S104 in FIG. 13 is determined to be "Yes". In such a case, step S110 in FIG. 13 is executed.

(a) Case in which the Present Embodiment is not Applied

One example of CPU drawing processing and GPU drawing processing of each drawing instruction in a case in which techniques disclosed in the embodiment are not applied is described using the timing chart illustrated in FIG. 18. In said illustration, time is indicated on the horizontal axis. Firstly, the illustration indicates time for execution of each drawing instruction by the CPU. Secondly, the illustration indicates time for execution of each drawing instruction by the GPU.

In accordance with the primary drawing instruction 601 "1A" from the primary program 11, from time T11 to time T12 the CPU 120 executes data processing, etc., corresponding to said drawing instruction (hereafter, executing data processing, etc., corresponding to a drawing instruction is referred to as "executing a drawing instruction"). During execution of the primary drawing instruction 601 "1A", the corresponding GPU instruction "1A" is stored in the command queue buffer 15. Subsequently, processing by the GPU 122 is requested. From time T12 to time T14, the GPU 122 performs drawing processing based on the GPU instruction 611 "1A" corresponding to the primary drawing instruction 601 "1A" (hereafter, drawing processing based on a GPU instruction is referred to as "GPU drawing processing"). Subsequently, GPU drawing processing according to the GPU instruction 611 "1A" is completed.

In accordance with the secondary drawing instruction 602 "2A" from the secondary program 12, from time T12 to time T13 the CPU 120 executes drawing processing. As a result, the GPU instruction "2A" corresponding to the secondary drawing instruction 602 "2A" is stored in the command queue buffer 15. Subsequently, processing by the GPU 122 is requested. However, at time T13, the GPU 122 is still executing GPU drawing processing according to the GPU instruction 611 "1A", and therefore GPU drawing processing according to the GPU instruction "2A" is postponed. At time T14, the GPU 122 completes the GPU instruction 611 "1A", and therefore starts execution of GPU drawing processing according to the GPU instruction 612 "2A". The GPU 122 executes GPU drawing processing in accordance with the GPU instruction 612 "2A" from time T14 to time T16. Subsequently, GPU drawing processing according to the GPU instruction 612 "2A" is completed.

In accordance with the primary drawing instruction 603 "1B" from the primary program 11, from time 113 to time T15 the CPU 120 executes drawing processing. As a result, the GPU instruction "1B" corresponding to the primary drawing instruction 603 "1B" is stored in the command queue buffer 15. Subsequently, processing by the GPU 122 is requested. However, at time T15, the GPU 122 is still executing GPU drawing processing according to the GPU instruction 612 "2A", and therefore GPU drawing processing according to the GPU instruction "1B" is postponed. At time T16, the GPU 122 completes GPU drawing processing according to the GPU instruction 612 "2A", and therefore starts execution of GPU drawing processing according to the GPU instruction 613 "1B". The GPU 122 executes GPU drawing processing in accordance with the GPU instruction 613 "1 B" from time T16 to time T18. Subsequently, GPU drawing processing according to the GPU instruction 613 "1B" is completed.

In accordance with the secondary drawing instruction 604 "2B" from the secondary program 12, the CPU 120 executes drawing processing from time T15 to time T17. As a result, the GPU instruction "2B" corresponding to the secondary drawing instruction 604 "2B" is stored in the command queue buffer 15. Subsequently, processing by the GPU 122 is requested. However, at time T17, the GPU 122 is still executing GPU drawing processing according to the GPU instruction 613 "1 B", and therefore GPU drawing processing according to the GPU instruction "2B" is postponed. At time T18, the GPU 122 completes GPU drawing processing according to the GPU instruction 613 "1B", and therefore starts execution of GPU drawing processing according to the GPU instruction 614 "2B". The GPU 122 executes GPU drawing processing in accordance with the GPU instruction 614 "2B" from time T18 to time T21. Subsequently, GPU drawing processing according to the GPU instruction 614 "2B" is completed.

In accordance with the primary drawing instruction 605 "1C" from the primary program 11, from time T17 to time T19 the CPU 120 executes drawing processing. As a result, the GPU instruction "1C" corresponding to the primary drawing instruction 605 "1C" is stored in the command queue buffer 15. Subsequently, processing by the GPU 122 is requested. However, at time T19, the GPU 122 is still executing GPU drawing processing according to the GPU instruction 614 "2B", and therefore GPU drawing processing according to the GPU instruction "1C" is postponed. At time T21, the GPU 122 completes GPU drawing processing according to the GPU instruction 614 "2B", and therefore starts execution of GPU drawing processing according to the GPU instruction 615 "1C". The GPU 122 executes GPU drawing processing in accordance with the GPU instruction 615 "1C" from time T21 to time T22. Subsequently, GPU drawing processing according to the GPU instruction 615 "1C" is completed.

GPU drawing processing corresponding to the primary drawing instructions "1A", "1B", and "1C" of the primary program 11 is completed as described above, and therefore drawing image data for a single frame is to be outputted to the frame buffer 155. However, the time of completing output of said drawing image data is time T22, and time T22 exceeds the frame display unit time T0 (607). Thus, even when the display 112 extracts drawing image data from the frame buffer 155 at a point from time T11 to a time after the frame display unit time T0 has passed, said drawing image data is incomplete. In this way, a problem with immediacy of display occurs.

(b) Case in which the Present Embodiment is Applied

One example of CPU drawing processing and GPU drawing processing of each drawing instruction in a case in which techniques disclosed in the embodiment are applied is described using the timing chart illustrated in FIG. 19. In said illustration, time is indicated on the horizontal axis. Firstly, the illustration indicates time for execution of each drawing instruction by the CPU 120. Secondly, the illustration indicates time for execution of each drawing instruction by the GPU 122.

In accordance with the primary drawing instruction 621 "1A" from the primary program 11, from time T31 to time T32 the CPU 120 executes drawing processing. As a result, the GPU instruction "1A" corresponding to the primary drawing instruction 621 "1A" is stored in the command queue buffer 15. Subsequently, processing by the GPU 122 is requested. From time T32 to time T34, the GPU 122 performs drawing processing according to the GPU instruction 631 "1A" corresponding to the primary drawing instruction 621 "1A". Subsequently, GPU drawing processing according to the GPU instruction 631 "1A" is completed.

In accordance with the secondary drawing instruction 622 "2A" from the secondary program 12, from time T32 to time T33 the CPU 120 executes drawing processing. As a result, the GPU instruction "2A" corresponding to the secondary drawing instruction 622 "2A" is stored in the command queue buffer 15. Subsequently, processing by the GPU 122 is requested. However, at time T33, the GPU 122 is still executing GPU drawing processing according to the GPU instruction 631 "1A", and therefore GPU drawing processing according to the GPU instruction "2A" is postponed. At time T34, the GPU 122 completes GPU drawing processing according to the GPU instruction 631 "1A", and therefore starts execution of GPU drawing processing according to the GPU instruction 632 "2A". The GPU 122 executes GPU drawing processing in accordance with the GPU instruction 632 "2A" from time T34 to time T36. Subsequently, GPU drawing processing according to the GPU instruction 632 "2A" is completed.

In accordance with the primary drawing instruction 623 "1B" from the primary program 11, from time T33 to time T35 the CPU 120 executes drawing processing. As a result, the GPU instruction "1 B" corresponding to the primary drawing instruction 623 "1B" is stored in the command queue buffer 15. Subsequently, processing by the GPU 122 is requested. However, at time T35, the GPU 122 is still executing GPU drawing processing according to the GPU instruction 632 "2A", and therefore GPU drawing processing according to the GPU instruction "1B" is postponed. At time T36, the GPU 122 completes GPU drawing processing according to the GPU instruction 632 "2A", and therefore starts execution of GPU drawing processing according to the next GPU instruction "1 B". The GPU 122 executes GPU drawing processing in accordance with the GPU instruction 633 "1B" from time T36 to time T38. Subsequently, GPU drawing processing according to the GPU instruction 633 "1B" is completed.

By using the estimated processing time calculated by the estimator 164 of the bandwidth controller 152, it is predicted that when performing GPU drawing processing according to the GPU instruction "2B" corresponding to the secondary drawing instruction "2B" from the secondary program 12, drawing processing according to the primary program 11 would not be completed within the frame display unit time T0 (627). Thus, in accordance with the determination of step S104 in FIG. 13, execution of the secondary drawing instruction "2B" by the CPU 120 is postponed.

In accordance with the primary drawing instruction 624 "1C" from the primary program 11, the CPU 120 executes drawing processing from time T35 to time T37. As a result, the GPU instruction "1C" corresponding to the primary drawing instruction 624 "1C" is stored in the command queue buffer 15. Subsequently, processing by the GPU 122 is requested. However, at time T37, the GPU 122 is still executing GPU drawing processing according to the GPU instruction 633 "1B", and therefore GPU drawing processing according to the GPU instruction "1C" is postponed. At time T38, the GPU 122 completes GPU drawing processing according to the GPU instruction 633 "1B", and therefore starts execution of GPU drawing processing according to the GPU instruction 634 "1C". The GPU 122 executes GPU drawing processing in accordance with the GPU instruction 634 "1C" from time T38 to time T39. Subsequently, GPU drawing processing according to the GPU instruction 634 "1C" is completed.

At time T39, drawing processing corresponding to the primary drawing instructions "1A", "1B", and "1C" from the primary program 11 is completed. Thus, drawing image data for a single frame according to the primary program 11 is outputted to the frame buffer 155 within the frame display unit time T0 (627).

Note that the secondary drawing instructions "2B" and "2C" from the secondary program 12, execution of which is postponed, are to be executed after time T40 when the next frame display unit time starts.

Further, in a case in which each drawing instruction of a plurality of drawing instructions is not dependent on a GPU instruction processed prior thereto, or when dependencies with respect to a result of a GPU instruction are predicted to be few, processing pertaining to the instruction monitor 162 may be omitted.

Further, in the command queue buffer 15, in a case in which few queued GPU instructions are present, processing may be simplified by not dividing the CPU time and GPU time.

(2) Here, one drawing instruction (hereafter, "dependent drawing instruction") is assumed to be dependent on a result of GPU drawing processing according to a GPU instruction based on a drawing instruction issued prior to the dependent drawing instruction (hereafter, "prerequisite drawing instruction"). In such a case, execution of the dependent drawing instruction cannot start until GPU drawing processing according to GPU instructions based on the prerequisite drawing instruction is completed.

For example, the primary drawing instruction "1B" from the primary program 11 cannot start without waiting for completion of GPU drawing processing according to GPU instructions based on the primary drawing instruction "1A" from the primary program 11. The primary drawing instruction "1 B" is a dependent drawing instruction and the primary drawing "1A" is a prerequisite drawing instruction.

Further, the primary drawing instruction "1C" from the primary program 11 cannot start without waiting for completion of GPU drawing processing according to GPU instructions based on the primary drawing instruction "1B" from the primary program 11. The primary drawing instruction "1C" is a dependent drawing instruction and the primary drawing "1B" is a prerequisite drawing instruction.

Further, the secondary drawing instruction "2B" from the secondary program 12 cannot start without waiting for completion of GPU drawing processing according to GPU instructions based on the secondary drawing instruction "2A" from the secondary program 12. The secondary drawing instruction "2B" is a dependent drawing instruction and the secondary drawing "2A" is a prerequisite drawing instruction.

Figure 20:
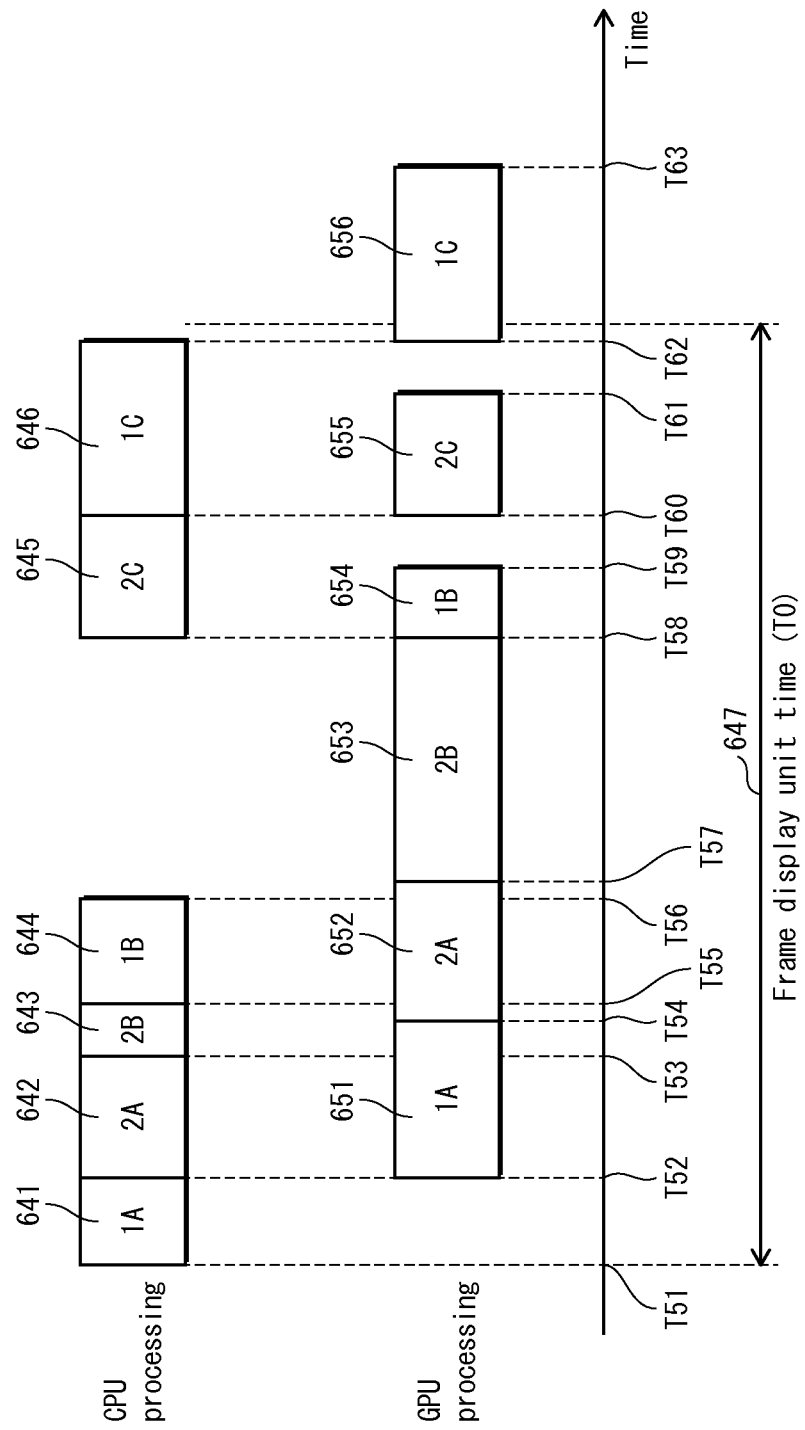
FIG. 20 is another timing chart illustrating one example of CPU drawing processing and GPU drawing processing of each drawing instruction in a case in which techniques disclosed in the embodiment are not applied.

FIG. 20 is a timing chart illustrating another example of CPU drawing processing and GPU drawing processing of each drawing instruction in a case in which techniques disclosed in the embodiment are not applied.

Figure 21:
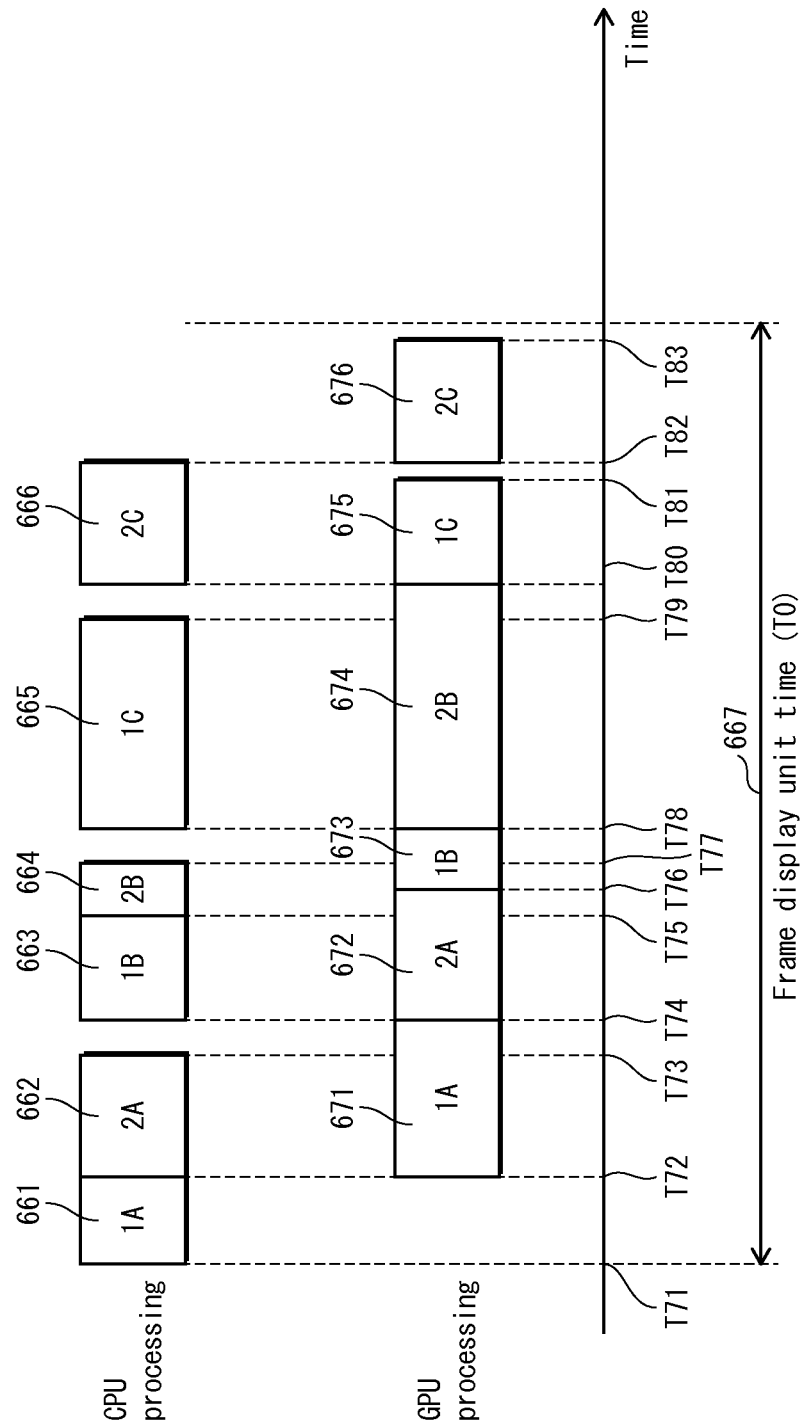
FIG. 21 is another timing chart illustrating one example of CPU drawing processing and GPU drawing processing of each drawing instruction in a case in which techniques disclosed in the embodiment are applied.

FIG. 21 is a timing chart illustrating another example of CPU drawing processing and GPU drawing processing of each drawing instruction in a case in which techniques disclosed in the embodiment are applied.

The primary drawing instructions "1A", "1B", and "1C" indicated in FIG. 20 correspond to the primary instructions "1A", "1B", and "1C" indicated in FIG. 21. Further, the secondary drawing instructions "2A", "2B", and "2C" indicated in FIG. 20 correspond to the secondary drawing instructions "2A", "2B", and "2C" indicated in FIG. 21.

The instruction monitor 162 receives the primary drawing instructions "1A", "1B", and "1C". Further, The instruction receiver 161 receives the secondary drawing instructions "2A", "2B", and "2C".

The drawing instructions "1A", "2A", "1B", "2B", "1C", and "2C" are received in the stated order over time.

(a) Case in which the Present Embodiment is not Applied

One example of CPU drawing processing and GPU drawing processing of each drawing instruction in a case in which techniques disclosed in the embodiment are not applied is described using the timing chart illustrated in FIG. 20. In said illustration, time is indicated on the horizontal axis. Firstly, the illustration indicates time for execution of each drawing instruction by the CPU. Secondly, the illustration indicates time for execution of each drawing instruction by the GPU.

In accordance with the primary drawing instruction 641 "1A" from the primary program 11, from time T51 to time T52 the CPU 120 executes drawing processing. As a result, the GPU instruction "1A" corresponding to the primary drawing instruction 641 "1A" is stored in the command queue buffer 15.

Subsequently, processing by the GPU 122 is requested. From time T52 to time T54, the GPU 122 performs GPU drawing processing according to the GPU instruction 651 "1A". Subsequently, GPU drawing processing according to the GPU instruction 651 "1A" is completed.

In accordance with the secondary drawing instruction 642 "2A" from the secondary program 12, from time T52 to time T53 the CPU 120 executes drawing processing. As a result, the GPU instruction "2A" corresponding to the secondary drawing instruction 642 "2A" is stored in the command queue buffer 15. Subsequently, processing by the GPU 122 is requested. However, at time T53, the GPU 122 is still executing GPU drawing processing according to the GPU instruction 651 "1A", and therefore GPU drawing processing according to the GPU instruction "2A" is postponed. At time T54, the GPU 122 completes GPU drawing processing according to the GPU instruction 651 "1A", and therefore starts execution of GPU drawing processing according to the GPU instruction 652 "2A". The GPU 122 executes GPU drawing processing in accordance with the GPU instruction 652 "2A" from time T54 to time T57. Subsequently, GPU drawing processing according to the GPU instruction 652 "2A" is completed.

Processing of the primary drawing instruction "1B" from the primary program 11 is to be started at time T53, but at time T53, the GPU drawing processing according to the GPU instruction 651 "1A" corresponding to the primary drawing instruction 641 "1A" is not completed. Accordingly, the primary drawing instruction "1B" is postponed. As a result, the secondary drawing instruction "2B" is executed by the CPU 120 prior to the primary drawing instruction "1B".

GPU drawing processing according to the GPU instruction 651 "1A" is completed at time T54, and after CPU processing according to the secondary drawing instruction 643 "2B" is completed at time T55, execution of CPU drawing processing according to the primary drawing instruction 644 "1B" is started. From time T55 to time T56, the CPU 120 executes CPU drawing processing according to the primary drawing instruction 644 "1 B". As a result, the GPU instruction "1 B" corresponding to the primary drawing instruction 644 "1B" is stored in the command queue buffer 15. Subsequently, processing by the GPU 122 is requested. At time T56, the GPU 122 is executing GPU drawing processing according to the GPU instruction 652 "2A". Further, because the GPU instruction "2B" corresponding to the secondary drawing instruction "2B" is already stored in the command queue buffer 15, the GPU instruction 654 "1B" corresponding to the primary drawing instruction 644 "1B" can be started at time T58 when GPU drawing processing according to the GPU instruction 653 "2B" is completed. The GPU 122 executes GPU drawing processing in accordance with the GPU instruction 654 "1B" from time T58 to time T59. Subsequently, GPU drawing processing according to the GPU instruction 654 "1B" is completed.

In accordance with the secondary drawing instruction 643 "2B" from the secondary program 12, from time T53 to time T55 the CPU 120 executes drawing processing. Subsequently, processing by the GPU 122 is requested. However, at time T55, the GPU 122 is executing GPU drawing processing according to the GPU instruction 652 "2A" corresponding to the secondary drawing instruction 642 "2A", and therefore the GPU instruction "2B" corresponding to the secondary drawing instruction "2B" is postponed. At time T57, the GPU 122 completes GPU drawing processing according to the GPU instruction 652 "2A", and therefore starts execution of GPU drawing processing according to the GPU instruction 653 "2B". The GPU 122 executes GPU drawing processing in accordance with the GPU instruction 653 "2B" from time T57 to time T58. Subsequently, GPU drawing processing according to the GPU instruction 653 "2B" is completed.

The secondary drawing instruction "2C" from the secondary program 12 is dependent on a processing result of the GPU instruction 653 "2B". Thus, the secondary drawing instruction "2C" is postponed until time T58 when GPU drawing processing according to the GPU instruction 653 "2B" is completed. Subsequently, from time T58 to time T60, the CPU 120 executes CPU drawing processing according to the secondary drawing instruction 645 "2C". As a result, the GPU instruction "2C" corresponding to the secondary drawing instruction 645 "2C" is stored in the command queue buffer 15. Subsequently, processing by the GPU 122 is requested. From time T60 to time T61, the GPU 122 performs GPU drawing processing according to the GPU instruction 655 "2C". Subsequently, GPU drawing processing according to the GPU instruction 655 "2C" is completed.

The primary drawing instruction "1C" from the primary program 11 is dependent on a processing result of the GPU instruction 654 "1B". Thus, the primary drawing instruction "1C" from the primary program 11 is postponed until time T59 when GPU drawing processing according to the GPU instruction 654 "1 B" is completed. After time T59, at time T60 when CPU drawing processing according to the secondary drawing instruction 645 "2C" from the secondary program 12 is completed, processing of the primary drawing instruction 646 "1C" is started. From time T60 to time T62, the CPU 120 executes CPU drawing processing according to the primary drawing instruction 646 "1C". Subsequently, processing by the GPU 122 is requested. From time T62 to time T63, the GPU 122 executes GPU drawing processing according to the GPU instruction 656 "1C" corresponding to the primary drawing instruction 646 "1C". Subsequently, GPU drawing processing according to the GPU instruction 656 "1C" is completed.

GPU drawing processing corresponding to the primary drawing instructions "1A", "1 B", and "1C" of the primary program 11 is completed as described above, and therefore drawing image data for a single frame is to be outputted to the frame buffer 155. Drawing image data for a single frame is outputted to the frame buffer 155 at time T63, at which point the frame display unit time T0 (647) is exceeded.

From time T51 to the time when the frame display unit time T0 (647) elapses, drawing image data according to the primary program 11 acquired from the frame buffer 155 by the display 112 is incomplete. In this way, a problem with immediacy of display occurs.

(b) Case in which the Present Embodiment is Applied

One example of CPU drawing processing and GPU drawing processing of each drawing instruction in a case in which techniques disclosed in the embodiment are applied is described using the timing chart illustrated in FIG. 21. In said illustration, time is indicated on the horizontal axis. Firstly, the illustration indicates time for execution of each drawing instruction by the CPU 120. Secondly, the illustration indicates time for execution of each drawing instruction by the GPU 122.

In accordance with the primary drawing instruction 661 "1A" from the primary program 11, from time T71 to time T72 the CPU 120 executes CPU drawing processing. As a result, the GPU instruction "1A" corresponding to the primary drawing instruction 661 "1A" is stored in the command queue buffer 15. Subsequently, processing by the GPU 122 is requested. From time T72 to time T74, the GPU 122 performs GPU drawing processing according to the GPU instruction 671 "1A" corresponding to the primary drawing instruction 661 "1A". Subsequently, GPU drawing processing according to the GPU instruction 671 "1A" is completed.

In accordance with the secondary drawing instruction 662 "2A" from the secondary program 12, from time T72 to time T73 the CPU 120 executes CPU drawing processing. As a result, the GPU instruction "2A" corresponding to the secondary drawing instruction 662 "2A" is stored in the command queue buffer 15. Subsequently, processing by the GPU 122 is requested. However, at time T73, the GPU 122 is still executing GPU drawing processing according to the GPU instruction 671 "1A", and therefore the GPU instruction "2A" corresponding to the secondary drawing instruction 662 "2A" is postponed. At time T74, the GPU 122 completes drawing processing according to the GPU instruction 671 "1A", and therefore starts execution of GPU drawing processing according to the GPU instruction "2A" corresponding to the secondary drawing instruction 662 "2A". The GPU 122 executes GPU drawing processing in accordance with the GPU instruction 672 "2A" corresponding to the secondary drawing instruction 662 "2A" from time T74 to time T76. Subsequently, GPU drawing processing according to the GPU instruction 672 "2A" is completed.

Processing of the primary drawing instruction "1B" from the primary program 11 is to be started at time T73. However, at time T73, GPU drawing processing according to the GPU instruction 671 "1A" corresponding to the primary drawing instruction 661 "1A" is not complete. Accordingly, the primary drawing instruction "1B" is postponed. After GPU drawing processing according to the GPU instruction 671 "1A" is completed at time T74, execution of CPU drawing processing according to the primary drawing instruction 663 "1B" is started. From time T74 to time T75, the CPU 120 executes the primary drawing instruction 663 "1B". As a result, the GPU instruction "1B" corresponding to the primary drawing instruction 663 "1B" is stored in the command queue buffer 15. Subsequently, processing by the GPU 122 is requested. At time T75, the GPU 122 is executing GPU drawing processing in accordance with the GPU instruction 672 "2A" corresponding to the secondary drawing instruction 662 "2A". Thus, the GPU 122 starts GPU drawing processing according to the GPU instruction "1B" at time T76 after GPU drawing processing according to the GPU instruction 672 "2A" is complete. The GPU 122 executes GPU drawing processing in accordance with the GPU instruction 673 "1B" from time T76 to time T78. Subsequently, GPU drawing processing according to the GPU instruction 673 "1B" is completed.

At time T73, when execution by the CPU 120 of the primary drawing instruction "1B" is postponed until GPU drawing processing according to the GPU instruction "1A" is completed, the determiner 163 of the bandwidth controller 152 determines whether processing of the secondary drawing instruction 664 "2B" from the secondary program 12 is to be continued or postponed.

In step S106 and step S107 in FIG. 13, the determiner 163 determines that the primary drawing instruction "1 B" is to be prioritized over the secondary drawing instruction "2B" according to the estimated remaining CPU processing time and the estimated remaining GPU processing time of the primary drawing instruction "1A", and that execution of the secondary drawing instruction "2B" is to be postponed.

Further, when the primary drawing instruction "1B" is to be started, the determiner 163 determines whether processing is to resumed according to step S203 and step S204 in FIG. 14, by using the estimated processing time of the primary drawing instruction "1B". As a result, the secondary drawing instruction "2B" continues to be postponed. When CPU drawing processing of the primary drawing instruction "1B" is completed at time T75, the determiner 163 determines whether processing is to resume according to step S203 and step S204 in FIG. 14, by using the estimated processing time of the secondary drawing instruction "2B". As a result, processing of the secondary drawing instruction "2B" is resumed. From time T75 to time T77, the CPU 120 executes the secondary drawing instruction "2B". As a result, the GPU instruction "2B" corresponding to the secondary drawing instruction "2B" is stored in the command queue buffer 15. Subsequently, processing by the GPU 122 is requested. However, at time T77, the GPU 122 is still executing GPU drawing processing according to the GPU instruction 673 "1 B". Thus execution of the GPU instruction "2B" is postponed. At time T78, the GPU 122 completes GPU drawing processing according to the GPU instruction 673 "1B". As a result, execution of GPU drawing processing according to the GPU instruction 674 "2B" is started. The GPU 122 executes GPU drawing processing in accordance with the GPU instruction 674 "2B" from time T78 to time T80. Subsequently, GPU drawing processing according to the GPU instruction 674 "2B" is completed.

Processing of the primary drawing instruction "1C" from the primary program 11 is to be started at time T75. However, GPU drawing processing according to the GPU instruction "1 B" corresponding to the primary drawing instruction 663 "1B" is not complete at such time. Accordingly, execution of the primary drawing instruction "1C" by the CPU 120 is postponed. As a result, the secondary drawing instruction "2B" is executed before the primary drawing instruction "1C". After GPU drawing processing according to the GPU instruction 673 "1B" is completed at time T78, the CPU 120 starts execution of the primary drawing instruction "1C". From time T78 to time T79, the CPU 120 executes the primary drawing instruction 665 "1C". As a result, the GPU instruction "1C" corresponding to the primary drawing instruction 665 "1C" is stored in the command queue buffer 15. Subsequently, processing by the GPU 122 is requested. At time T79, the GPU 122 is executing GPU drawing processing according to the GPU instruction 674 "2B". Accordingly, after GPU drawing processing according to the GPU instruction 674 "2B" is completed at time T80, execution of GPU drawing processing according to the GPU instruction "1C" corresponding to the primary drawing instruction 665 "1C" is started. The GPU 122 executes GPU drawing processing in accordance with the GPU instruction 675 "1C" from time T80 to time T81. Subsequently, GPU drawing processing according to the GPU instruction "IC" is completed.

At time T81, drawing processing corresponding to the primary drawing instructions "1A", "1B", and "1C" from the primary program 11 is completed as described above. Thus, drawing image data for a single frame according to the primary program 11 is outputted to the frame buffer 155 within the frame display unit time T0 (667).

Note that in the timing chart illustrated in FIG. 21, the secondary drawing instruction "2C" of the secondary program 12 is also completed at time T83. In this way, drawing processing according to the secondary program 12 is also completed within the frame display unit time T0 (667).

1.8 Summary

As described above, according to the present embodiment, a superior effect is achieved of favorably maintaining display performance of a graphic requiring immediate display in a case in which the graphic requiring immediate display and a graphic not requiring immediate display are to be displayed in a single frame.

2. Other Modifications

In the present disclosure, description is based on the above embodiment and each modification, but the present disclosure is not limited to the above embodiment and each modification. Modifications as indicated below may be made.

Figure 22:
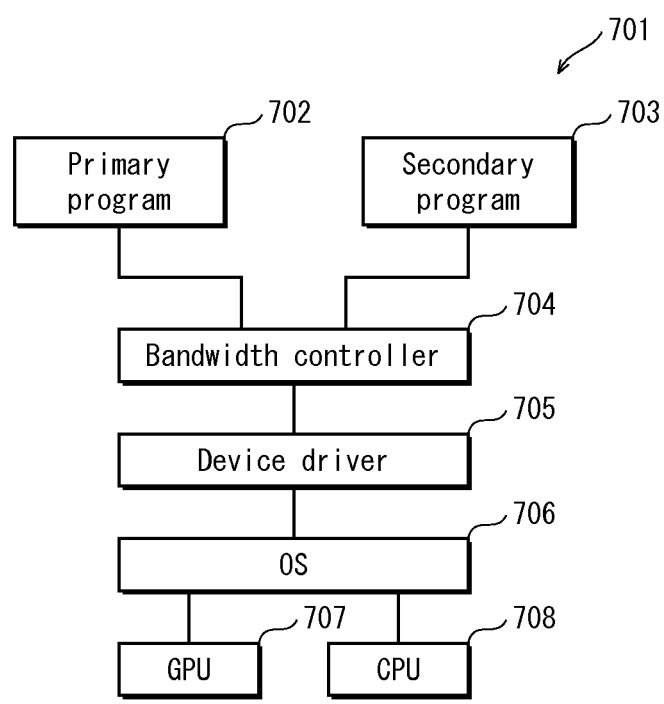
FIG. 22 is a block diagram illustrating one example of a functional configuration of a graphics display processing device 700 as one example modification.
Figure 23:
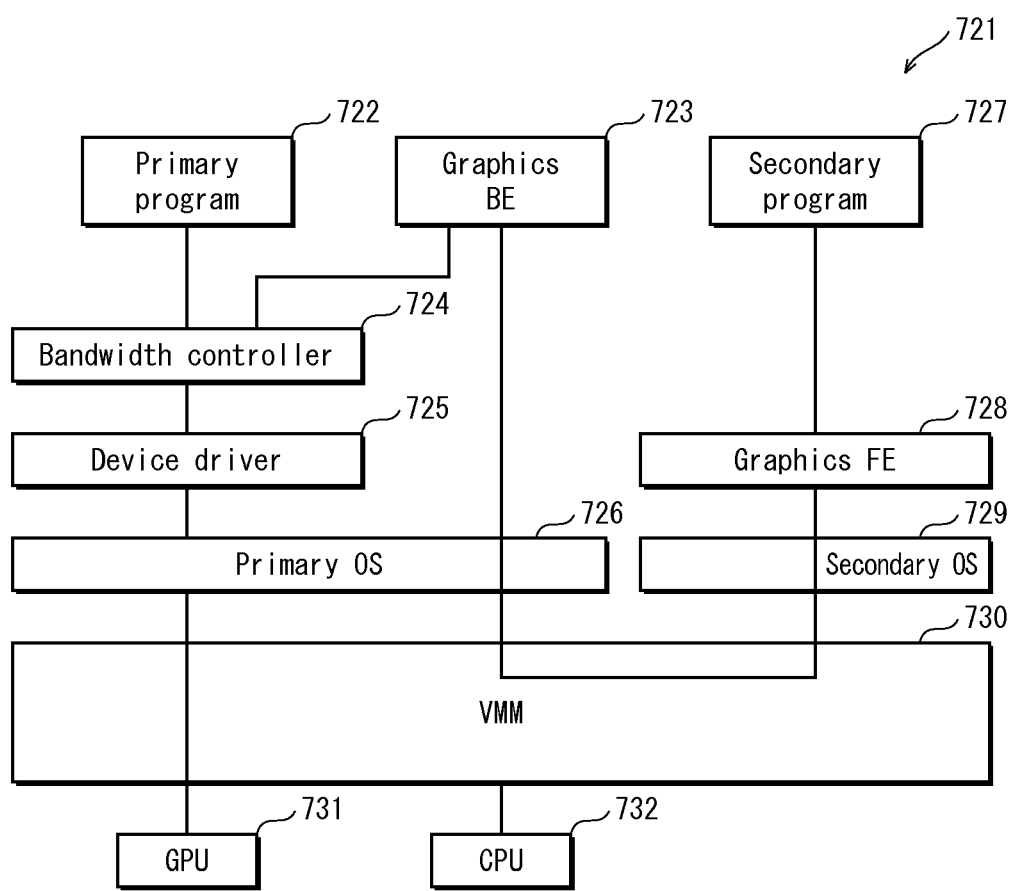
FIG. 23 is a block diagram illustrating one example of a functional configuration of a graphics display processing device 721 as another example modification.

(1) Program configuration of the graphics display processing device may be as illustrated in FIG. 22.

A primary program 702, a secondary program 703, a bandwidth controller 704 and a device driver 705 operate under an operating system (OS) 706.

The primary program 702, the secondary program 703, the bandwidth controller 704, and the device driver 705 have the same configurations as the primary program 11, the secondary program 12, the bandwidth controller 152, and the graphics driver 153 of the above embodiment.

The primary program 702, the secondary program 703, the bandwidth controller 704, and the device driver 705 access a GPU 707 and a CPU 708 under the control of the OS 706.

Further, the primary program 702 and the secondary program 703 output GPU instructions to the GPU 707 via the bandwidth controller 704, the device driver 705, and the OS 706.

(2) Program configuration of the graphics display processing device may be as illustrated in FIG. 22.

A first OS 726 and a second OS 729 operate under a virtual machine monitor (VMM) 730. The VMM 730 is a virtual computer, and is software that allows parallel processing of a plurality of different OSs.

A primary program 722, a graphics back-end (BE) 723, a bandwidth controller 724, and a device driver 725 operate under the first OS 726.

A secondary program 727 and a graphic front-end (FE) 728 operate under the second OS 729.

The primary program 722, the secondary program 727, the bandwidth controller 724, and the device driver 725 have the same configurations as the primary program 11, the secondary program 12, the bandwidth controller 152, and the graphics driver 153 of the above embodiment.

The primary program 722 output GPU instructions to the GPU 707 via the bandwidth controller 724, the device driver 725, the first OS 726, and the VMM 730.

The secondary program 722 outputs GPU instructions to the GPU 707 via the graphics FE 728, the second OS 729, the VMM 730, the first OS 726, the graphics BE 723, the bandwidth controller 724, the device driver 725, the first OS 726, and the VMM 730.

(3) An aspect of the present disclosure is a graphics display processing device that displays, in a single frame, a primary graphic requiring immediate display and a secondary graphic not requiring immediate display, the graphics display processing device comprising: a program storage that stores a primary drawing instruction specifying drawing of the primary graphic and a secondary drawing instruction specifying drawing of the secondary graphic; a graphics processor that performs drawing processing by executing GPU instructions generated based on each drawing instruction; an acquirer that acquires the primary drawing instruction and the secondary drawing instruction from the program storage; an estimator that calculates an estimated GPU processing time required for the drawing processing by the graphics processor due to execution of the GPU instructions generated based on the primary drawing instruction or the secondary drawing instruction; a determiner that determines, by using the estimated GPU processing time, which of the primary drawing instruction and the secondary drawing instruction is to be executed first; an issuance controller that performs a control when the determiner determines that the primary drawing instruction is to be executed first, causing the primary drawing instruction to be issued and issuance of the secondary drawing instruction to be postponed; an instruction issuer that issues each drawing instruction according to the control of the issuance controller; and an instruction executor that generates the GPU instructions by executing each drawing instruction issued.

Before GPU instructions based on the secondary drawing instruction are executed and within a single frame display unit time in which the GPU instructions are to be executed, execution may be completed of GPU instructions generated based on a tertiary drawing instruction specifying a tertiary graphic not requiring immediate display, the estimator may calculate the estimated GPU processing time for execution of the GPU instructions based on the secondary drawing instruction, and the determiner may store a cumulative GPU processing time required for execution of the GPU instructions based on the tertiary drawing instruction, calculate a total GPU processing time by summing the cumulative GPU processing time and the estimated GPU processing time, and compare the total GPU processing time and a limit value of an acceptable processing time for drawing processing due to GPU instructions of a graphic not requiring immediate display, and when the total GPU processing time exceeds the limit value, may determine that the primary drawing instruction is to be executed first within the frame display unit time.

The estimator may calculate the estimated GPU processing time for execution of the GPU instructions based on the primary drawing instruction, and the determiner may store a start time of the GPU instructions generated based on the primary drawing instruction, calculate an elapsed time from the start time to a current time, calculate a remaining GPU processing time by subtracting the elapsed time from the estimated GPU processing time, and compare the remaining GPU processing time and a priority threshold value assigned to the primary drawing instruction, and when the remaining GPU processing time is less than the priority threshold value, may determine that the primary drawing instruction is to be executed first.

Before GPU instructions based on the primary drawing instruction are executed and within a single frame display unit time in which the GPU instructions are to be executed, execution may be completed of GPU instructions generated based on a tertiary drawing instruction specifying a tertiary graphic requiring immediate display, the estimator may calculate the estimated GPU processing time for execution of the GPU instructions based on the primary drawing instruction, and the determiner may store a cumulative GPU processing time required for execution of the GPU instructions based on the tertiary drawing instruction, calculate a total GPU processing time by summing the cumulative GPU processing time and the estimated GPU processing time, and compare the total GPU processing time and a priority threshold value assigned to the primary drawing instruction, and when the estimated GPU processing time is less than the priority threshold value, may determine that the primary drawing instruction is to be executed first.

The estimator may further calculate an estimated CPU processing time for processing by the instruction executor due to execution of the primary drawing instruction and the secondary drawing instruction, and the determiner may use the estimated CPU processing time and the estimated GPU processing time when determining which of the primary drawing instruction and the secondary drawing instruction is to be executed first.

Before the secondary drawing instruction and the GPU instructions based on the secondary drawing instruction are executed and within a single frame display unit time in which the secondary drawing instruction and the GPU instructions are to be executed, execution may be completed of a tertiary drawing instruction and GPU instructions generated based on the tertiary drawing instruction, the tertiary drawing instruction specifying a tertiary graphic not requiring immediate display, the estimator may calculate the estimated GPU processing time due to execution of the GPU instructions based on the secondary drawing instruction and further calculate an estimated CPU processing time for processing by the instruction executor due to execution of the secondary drawing instruction, and the determiner may store a cumulative CPUGPU processing time required for execution of the tertiary drawing instruction by the instruction executor and execution of the GPU instructions based on the tertiary drawing instruction by the graphics processor, calculate a total CPUGPU processing time by summing the cumulative CPUGPU processing time, the estimated CPU processing time, and the estimated GPU processing time, and compare the total CPUGPU processing time and a limit value of an acceptable processing time for processing due to drawing instructions and drawing processing due to the GPU instructions of a graphic not requiring immediate display, and when the total CPUGPU processing time exceeds the limit value, may determine that the primary drawing instruction is to be executed first within the single frame display unit time.

The estimator may calculate the estimated GPU processing time due to execution of the GPU instructions based on the primary drawing instruction and further calculate an estimated CPU processing time for processing by the instruction executor due to execution of the primary drawing instruction, and the determiner may store a start time of the primary drawing instruction, calculate an elapsed time from the start time to a current time, calculate a sum value that is a sum of the estimated GPU processing time and the estimated CPU processing time, calculate a remaining CPUGPU processing time by subtracting the elapsed time from the sum time, and compare the remaining CPUGPU processing time and a priority threshold value assigned to the primary drawing instruction and the GPU instructions based on the primary drawing instruction, and when the remaining CPUGPU processing time is less than the priority threshold value, may determine that the primary drawing instruction is to be executed first.

Before the primary drawing instruction and the GPU instructions based on the primary drawing instruction are executed and within a single frame display unit time in which the primary drawing instruction and the GPU instructions are to be executed, execution may be completed of a tertiary drawing instruction and GPU instructions generated based on the tertiary drawing instruction specifying a tertiary graphic requiring immediate display, the estimator may calculate the estimated GPU processing time due to execution of the GPU instructions based on the primary drawing instruction and further calculate an estimated CPU processing time for processing by the instruction executor due to execution of the primary drawing instruction, and the determiner may store a cumulative CPUGPU processing time required for execution of the tertiary drawing instruction by the instruction executor and execution of the GPU instructions based on the tertiary drawing instruction by the graphics processor, calculate a total CPUGPU processing time by summing the cumulative CPUGPU processing time, the estimated CPU processing time, and the estimated GPU processing time, and compare the total CPUGPU processing time and a priority threshold value assigned to the primary drawing instruction and the GPU instructions based on the primary drawing instruction, and when the total CPUGPU processing time is less than the priority threshold value, may determine that the primary drawing instruction is to be executed first.

The graphics display processing device may further include a prioritizer that sets a priority of the primary drawing instruction higher than a priority of the second drawing instruction when the determiner determines that the primary drawing instruction is to be executed first; and a task scheduler that controls acquisition by the acquirer according to the priority set by the prioritizer.

The graphics display processing device may be installed in a vehicle, wherein the primary graphic may be one of a graphic indicating speed at which the vehicle is travelling, a graphic indicating revolutions of an engine or motor included in the vehicle, a graphic indicating an alert pertaining to a mechanism, equipment, or machinery included in the vehicle, and a graphic indicating an alert pertaining to traffic conditions around the vehicle while the vehicle is in motion, and the secondary graphic may be a map graphic for guiding a driver of the vehicle.

Further, another aspect of the present disclosure is a graphics display processing method used in a graphics display processing device that displays, in a single frame, a primary graphic requiring immediate display and a secondary graphic not requiring immediate display, the graphics display processing device including: a program storage that stores a primary drawing instruction specifying drawing of the primary graphic and a secondary drawing instruction specifying drawing of the secondary graphic; and a graphics processor that performs drawing processing by executing GPU instructions generated based on each drawing instruction, wherein the graphics display processing method comprises: acquiring the primary drawing instruction and the secondary drawing instruction from the program storage; calculating an estimated GPU processing time required for the drawing processing by the graphics processor due to execution of the GPU instructions generated based on the primary drawing instruction or the secondary drawing instruction; determining, by using the estimated GPU processing time, which of the primary drawing instruction and the secondary drawing instruction is to be executed first; performing a control when determining that the primary drawing instruction is to be executed first, causing the primary drawing instruction to be issued and issuance of the secondary drawing instruction to be postponed; issuing each drawing instruction according to the control; and generating the GPU instructions by executing each drawing instruction issued.

Further, another aspect of the present disclosure is an integrated circuit comprising a graphics display processing device that displays, in a single frame, a primary graphic requiring immediate display and a secondary graphic not requiring immediate display, the graphics display processing device comprising: a program storage that stores a primary drawing instruction specifying drawing of the primary graphic and a secondary drawing instruction specifying drawing of the secondary graphic; a graphics processor that performs drawing processing by executing GPU instructions generated based on each drawing instruction; an acquirer that acquires the primary drawing instruction and the secondary drawing instruction from the program storage; an estimator that calculates an estimated GPU processing time required for the drawing processing by the graphics processor due to execution of the GPU instructions generated based on the primary drawing instruction or the secondary drawing instruction; a determiner that determines, by using the estimated GPU processing time, which of the primary drawing instruction and the secondary drawing instruction is to be executed first; an issuance controller that performs a control when the determiner determines that the primary drawing instruction is to be executed first, causing the primary drawing instruction to be issued and issuance of the secondary drawing instruction to be postponed; an instruction issuer that issues each drawing instruction according to the control of the issuance controller; and an instruction executor that generates the GPU instructions by executing each drawing instruction issued.

Further, another aspect of the present disclosure is a vehicle equipped with a graphics display processing device that displays, in a single frame, a primary graphic requiring immediate display and a secondary graphic not requiring immediate display, wherein the graphics display processing device comprises: a program storage that stores a primary drawing instruction specifying drawing of the primary graphic and a secondary drawing instruction specifying drawing of the secondary graphic; a graphics processor that performs drawing processing by executing GPU instructions generated based on each drawing instruction; an acquirer that acquires the primary drawing instruction and the secondary drawing instruction from the program storage; an estimator that calculates an estimated GPU processing time required for the drawing processing by the graphics processor due to execution of the GPU instructions generated based on the primary drawing instruction or the secondary drawing instruction; a determiner that determines, by using the estimated GPU processing time, which of the primary drawing instruction and the secondary drawing instruction is to be executed first; an issuance controller that performs a control when the determiner determines that the primary drawing instruction is to be executed first, causing the primary drawing instruction to be issued and issuance of the secondary drawing instruction to be postponed; an instruction issuer that issues each drawing instruction according to the control of the issuance controller; and an instruction executor that generates the GPU instructions by executing each drawing instruction issued.

(4) An aspect of the present disclosure is a graphics display processing device comprising: a processor; a graphics processor; and an instruction receiver that receives a drawing instruction included in a program having lower priority than a specified program; a processing time estimation step that estimates time required for execution by the graphics processor of drawing processing based on the drawing instruction included in the program having lower priority; a processing determiner that, based on the estimated time, determines whether the drawing instruction included in the program having lower priority is issued to the processor or postponed; and a processing timing adjustor that, based on determination by the processing determiner, adjusts timing of issuing of the drawing instruction included in the program having lower priority to the processor.

This aspect of the present disclosure allows display of a program having lower priority than a specified program (a program not requiring immediate display) while ensuring immediacy of display processing of the specified program requiring immediate display.

The graphics display processing device may further comprise: an instruction monitor that monitors whether a drawing instruction included in the specified program is received; and a processing priority adjuster that issues to the processor the drawing instruction included in the specified program and received according to the instruction monitor before the drawing instruction included in the program having lower priority.

The processing determiner may store a time limit that allows drawing processing associated with the program having lower priority by the graphics processor in a predefined time period that allows completion of drawing processing associated with the specified program by the graphics processor, and may determine whether the drawing instruction included in the program having lower priority is issued to the processor or postponed, based on the time limit and the estimated time.

Another aspect of the present disclosure is a graphics display processing method used in a computer that has a processor and a graphics processor, the graphics display processing method comprising: an instruction receiving step of receiving a drawing instruction included in a program having lower priority than a specified program; a processing time estimation step of estimating time required for execution by the graphics processor of drawing processing based on the drawing instruction included in the program having lower priority; a determiner that determines, based on the estimated time, whether the drawing instruction included in the program having lower priority is issued to the processor or postponed; and timing adjustment step of adjusting, based on determination by the processing determiner, timing of issuing of the drawing instruction included in the program having lower priority to the processor.

Further, an aspect of the present disclosure is an integrated circuit comprising: a processor; a graphics processor; and an instruction receiver that receives a drawing instruction included in a program having lower priority than a specified program; a processing time estimation step that estimates time required for execution by the graphics processor of drawing processing based on the drawing instruction included in the program having lower priority; a processing determiner that, based on the estimated time, determines whether the drawing instruction included in the program having lower priority is issued to the processor or postponed; and a processing timing adjustor that, based on determination by the processing determiner, adjusts timing of issuing of the drawing instruction included in the program having lower priority to the processor.

(5) Each function block of the graphics display processing device 100 illustrated in FIG. 4 and FIG. 5 is typically implemented as a program processed by a combination of a processor and an external memory. However, each function block may be implemented by an LSI. Each function block may be an individual chip. A portion or all of the function blocks may be included in one chip. Here, each function block is referred to as an LSI, but each function block may be an IC of differing integration densities, a system LSI, a super LSI, or an ultra LSI.

Further, methods of circuit integration are not limited to LSI, and implementation may be achieved by a dedicated circuit or general-purpose processor. After LSI manufacture, a field programmable gate array (FPGA) and/or a reconfigurable processor that allows reconfiguring of connections and settings of circuit cells within an LSI may be used.

Furthermore, if circuit integration technology to replace LSI arises due to progress in semiconductor technology or other derivative technologies, such technology may of course be used to perform integration of function blocks.

Further, the graphics display processing device described in the embodiment and each modification may also be applied to various computers, electronic devices, information devices, AV devices, communication devices, and home appliances as long as the graphics display processing device is a computing device equipped with a CPU, GPU, and timer. For example, the graphics display processing device may also be applied to a personal computer (PC), a portable information terminal (mobile phone, smartphone, PDA, etc.), a television, a hard-disk drive, various disc recorders using DVD, Blu-ray disc, etc., various disc players using DVD, Blu-ray disc, etc., a car navigation device, etc.

Such devices are provided with a display device and are mounted on a vehicle, electric locomotive, diesel locomotive, train, linear motor car, aircraft, ship, etc.

(6) As described above, each device is a computer system including a CPU, a GPU, and memory. The memory stores a computer program and the CPU and the GPU operate according to the computer program.

Here, the computer program is composed of a plurality of instruction codes indicating commands for a computer to achieve predefined functions.

Further, the computer program may be stored on a computer-readable storage medium such as a flexible disk, hard disk, CD-ROM, MO, DVD, DVD-ROM, DVD-RAM, Blu-Ray Disc, semiconductor memory, etc.

Further, the computer program may be transmitted via telecommunication lines, a wireless or wired communication circuit, a network such as the internet, a data broadcast, etc.

Further, by storing the computer program on a storage medium and transferring the computer program, or by transmitting the computer program via a network, etc., the computer may be executed by another independent computer system.

(7) In all respects, the above description is only illustrative of the present disclosure and is not intended to limit the scope thereof. Without departing from the scope of the present disclosure, it is of course possible to make various improvements and modifications.

(8) The embodiment and modifications described above may be combined.

INDUSTRIAL APPLICABILITY

The graphics display processing device pertaining to the present disclosure achieves the superior effect of favorably maintaining display performance of a graphic requiring immediate display in a case in which the graphic requiring immediate display and a graphic not requiring immediate display are to be displayed in a single frame. Thus, the graphics display processing device is applicable to techniques of displaying a graphic that requires immediate display and a graphic that does not require immediate display in one frame.

REFERENCE SIGNS LIST

10 vehicle
15 command queue buffer
20 temperature sensor
30 revolution sensor
40 speed sensor
50 fuel sensor
60 steering wheel
100 graphics display processing device
110 integrated circuit
111 input unit
112 display
113 clock generator
144 navigation unit
120 CPU
121 memory
122 GPU
123 bus
124 first interface
125 second interface
126 third interface
127 fourth interface
127 display
151 program storage
152 bandwidth controller
153 graphics driver
154 data storage
155 frame buffer
156 timer
157 task scheduler
160 acquirer
161 instruction receiver
162 instruction monitor
163 determiner
164 estimator
165 instruction issuer
166 issuance controller
167 priority setter

The invention claimed is:

1. A graphics display processing device that displays, in a single frame, a primary graphic requiring immediate display and a secondary graphic not requiring immediate display, the graphics display processing device comprising:
   a program storage that stores a primary drawing instruction specifying drawing of the primary graphic and a secondary drawing instruction specifying drawing of the secondary graphic;
   a graphics processor that performs drawing processing by executing graphics instructions generated based on each drawing instruction;
   an acquirer that acquires the primary drawing instruction and the secondary drawing instruction from the program storage;
   an estimator that calculates an estimated graphics processing time required for the drawing processing by the graphics processor due to execution of the graphics instructions generated based on the secondary drawing instruction;

a determiner that determines, by using the estimated graphics processing time, which of the primary drawing instruction and the secondary drawing instruction is to be executed first;

an issuance controller that performs a control when the determiner determines that the primary drawing instruction is to be executed first, causing the primary drawing instruction to be issued and issuance of the secondary drawing instruction to be postponed;

an instruction issuer that issues each drawing instruction according to the control of the issuance controller; and an instruction executor that generates the graphics instructions by executing each drawing instruction issued by the instruction issuer, wherein before graphics instructions based on the secondary drawing instruction are executed and within a single frame display unit time in which the graphics instructions are to be executed, execution is completed of graphics instructions generated based on a tertiary drawing instruction specifying a tertiary graphic not requiring immediate display, and the determiner stores a cumulative graphics processing time required for execution of the graphics instructions based on the tertiary drawing instruction, calculates a total graphics processing time by summing the cumulative graphics processing time and the estimated graphics processing time, and compares the total graphics processing time and a limit value of an acceptable processing time for drawing processing due to graphics instructions of a graphic not requiring immediate display, and when the total graphics processing time exceeds the limit value, determines that the primary drawing instruction is to be executed first within the frame display unit time.

2. A graphics display processing device that displays, in a single frame, a primary graphic requiring immediate display and a secondary graphic not requiring immediate display, the graphics display processing device comprising:

a program storage that stores a primary drawing instruction specifying drawing of the primary graphic and a secondary drawing instruction specifying drawing of the secondary graphic;

a graphics processor that performs drawing processing by executing graphics instructions generated based on each drawing instruction;

an acquirer that acquires the primary drawing instruction and the secondary drawing instruction from the program storage;

an estimator that calculates an estimated graphics processing time required for the drawing processing by the graphics processor due to execution of the graphics instructions generated based on the primary drawing instruction;

a determiner that determines, by using the estimated graphics processing time, which of the primary drawing instruction and the secondary drawing instruction is to be executed first;

an issuance controller that performs a control when the determiner determines that the primary drawing instruction is to be executed first, causing the primary drawing instruction to be issued and issuance of the secondary drawing instruction to be postponed;

an instruction issuer that issues each drawing instruction according to the control of the issuance controller; and an instruction executor that generates the graphics instructions by executing each drawing instruction issued by the instruction issuer, wherein and the determiner stores a start time of the graphics instructions generated based on the primary drawing instruction, calculates an elapsed time from the start time to a current time, calculates a remaining graphics processing time by subtracting the elapsed time from the estimated graphics processing time, and compares the remaining graphics processing time and a priority threshold value assigned to the primary drawing instruction, and when the remaining graphics processing time is less than the priority threshold value, determines that the primary drawing instruction is to be executed first.

3. The graphics display processing device of claim 1, wherein before graphics instructions based on the primary drawing instruction are executed and within the single frame display unit time in which the graphics instructions are to be executed, execution is completed of the graphics instructions generated based on the tertiary drawing instruction specifying the tertiary graphic requiring immediate display, the estimator further calculates the estimated graphics processing time for execution of the graphics instructions based on the primary drawing instruction, and the determiner compares the total graphics processing time and a priority threshold value assigned to the primary drawing instruction, and when the estimated graphics processing time is less than the priority threshold value, determines that the primary drawing instruction is to be executed first.

4. The graphics display processing device of claim 1, wherein the estimator further calculates an estimated central processing time for processing by the instruction executor due to execution of the primary drawing instruction and the secondary drawing instruction, and the determiner uses the estimated central processing time and the estimated graphics processing time when determining which of the primary drawing instruction and the secondary drawing instruction is to be executed first.

5. The graphics display processing device of claim 4, wherein before the secondary drawing instruction and the graphics instructions based on the secondary drawing instruction are executed and within the single frame display unit time in which the secondary drawing instruction and the graphics instructions are to be executed, execution is completed of the tertiary drawing instruction and graphics instructions generated based on the tertiary drawing instruction, the estimator further calculates an estimated CPU central processing time for processing by the instruction executor due to execution of the secondary drawing instruction, and the determiner stores a cumulative combined processing time required for execution of the tertiary drawing instruction by the instruction executor and execution of the graphics instructions based on the tertiary drawing instruction by the graphics processor, calculates a total combined processing time by summing the cumulative combined processing time, the estimated central processing time, and the estimated graphics processing time, and compares the total combined processing time and the limit value of the acceptable processing time for processing due to drawing instructions and the drawing processing due to the graphics instructions of the graphic not requiring immediate display, and when the total combined processing time exceeds the limit value, determines that the primary drawing instruction is to be executed first within the single frame display unit time.

6. The graphics display processing device of claim 4, wherein the estimator further calculates the estimated graphics processing time due to execution of the graphics instructions based on the primary drawing instruction and further calculates an estimated central processing time for processing by the instruction executor due to execution of the primary drawing instruction, and the determiner stores a start time of the primary drawing instruction, calculates an elapsed time from the start time to a current time, calculates a sum value that is a sum of the estimated graphics processing time and the estimated central processing time, calculates a remaining combined processing time by subtracting the elapsed time from the sum time, and compares the remaining combined processing time and a priority threshold value assigned to the primary drawing instruction and the graphics instructions based on the primary drawing instruction, and when the remaining combined processing time is less than the priority threshold value, determines that the primary drawing instruction is to be executed first.

7. The graphics display processing device of claim 4, wherein before the primary drawing instruction and the graphics instructions based on the primary drawing instruction are executed and within the single frame display unit time in which the primary drawing instruction and the graphics instructions are to be executed, execution is completed of the tertiary drawing instruction and graphics instructions generated based on the tertiary drawing instruction specifying the tertiary graphic requiring immediate display, the estimator calculates the estimated graphics processing time due to execution of the graphics instructions based on the primary drawing instruction and further calculates an estimated central processing time for processing by the instruction executor due to execution of the primary drawing instruction, and the determiner stores a cumulative combined processing time required for execution of the tertiary drawing instruction by the instruction executor and execution of the graphics instructions based on the tertiary drawing instruction by the graphics processor, calculates a total combined processing time by summing the cumulative combined processing time, the estimated central processing time, and the estimated graphics processing time, and compares the total combined processing time and a priority threshold value assigned to the primary drawing instruction and the graphics instructions based on the primary drawing instruction, and when the total combined processing time is less than the priority threshold value, determines that the primary drawing instruction is to be executed first.

8. The graphics display processing device of claim 1, further comprises:

a prioritizer that sets a priority of the primary drawing instruction higher than a priority of the second drawing instruction when the determiner determines that the primary drawing instruction is to be executed first; and a task scheduler that controls acquisition by the acquirer according to the priority set by the prioritizer.

9. The graphics display processing device of claim 1 installed in a vehicle, wherein the primary graphic is one of a graphic indicating speed at which the vehicle is travelling, a graphic indicating revolutions of an engine or motor included in the vehicle, a graphic indicating an alert pertaining to a mechanism, equipment, or machinery included in the vehicle, and a graphic indicating an alert pertaining to traffic conditions around the vehicle while the vehicle is in motion, and the secondary graphic is a map graphic for guiding a driver of the vehicle.

10. A graphics display processing method used in a graphics display processing device that displays, in a single frame, a primary graphic requiring immediate display and a secondary graphic not requiring immediate display, the graphics display processing device including:

a program storage that stores a primary drawing instruction specifying drawing of the primary graphic and a secondary drawing instruction specifying drawing of the secondary graphic; and a graphics processor that performs drawing processing by executing graphics instructions generated based on each drawing instruction, wherein the graphics display processing method comprises:

acquiring the primary drawing instruction and the secondary drawing instruction from the program storage;

calculating an estimated graphics processing time required for the drawing processing by the graphics processor due to execution of the graphics instructions generated based on the secondary drawing instruction;

determining, by using the estimated graphics processing time, which of the primary drawing instruction and the secondary drawing instruction is to be executed first;

performing a control when determining that the primary drawing instruction is to be executed first, causing the primary drawing instruction to be issued and issuance of the secondary drawing instruction to be postponed;

issuing each drawing instruction according to the control; and generating the graphics instructions by executing each drawing instruction issued, and before graphics instructions based on the secondary drawing instruction are executed and within a single frame display unit time in which the graphics instructions are to be executed, execution is completed of graphics instructions generated based on a tertiary drawing instruction specifying a tertiary graphic not requiring immediate display, the graphics display processing method comprises storing a cumulative graphics processing time required for execution of the graphics instructions based on the tertiary drawing instruction, calculating a total graphics processing time by summing the cumulative graphics processing time and the estimated graphics processing time, and comparing the total graphics processing time and a limit value of an acceptable processing time for drawing processing due to graphics instructions of a graphic not requiring immediate display, and when the total graphics processing time exceeds the limit value, determining that the primary drawing instruction is to be executed first within the frame display unit time.

11. An integrated circuit comprising a graphics display processing device that displays, in a single frame, a primary graphic requiring immediate display and a secondary graphic not requiring immediate display, the integrated circuit comprising:

a program storage that stores a primary drawing instruction specifying drawing of the primary graphic and a secondary drawing instruction specifying drawing of the secondary graphic;

a graphics processor that performs drawing processing by executing graphics instructions generated based on each drawing instruction;

an acquirer that acquires the primary drawing instruction and the secondary drawing instruction from the program storage;

an estimator that calculates an estimated graphics processing time required for the drawing processing by the graphics processor due to execution of the graphics instructions generated based on the secondary drawing instruction;

a determiner that determines, by using the estimated graphics processing time, which of the primary drawing instruction and the secondary drawing instruction is to be executed first;

an issuance controller that performs a control when the determiner determines that the primary drawing instruction is to be executed first, causing the primary drawing instruction to be issued and issuance of the secondary drawing instruction to be postponed;

an instruction issuer that issues each drawing instruction according to the control of the issuance controller; and an instruction executor that generates the graphics instructions by executing each drawing instruction issued, wherein before graphics instructions based on the secondary drawing instruction are executed and within a single frame display unit time in which the graphics instructions are to be executed, execution is completed of graphics instructions generated based on a tertiary drawing instruction specifying a tertiary graphic not requiring immediate display, the determiner stores a cumulative graphics processing time required for execution of the graphics instructions based on the tertiary drawing instruction, calculates a total graphics processing time by summing the cumulative graphics processing time and the estimated graphics processing time, and compares the total graphics processing time and a limit value of an acceptable processing time for drawing processing due to graphics instructions of a graphic not requiring immediate display, and when the total graphics processing time exceeds the limit value, determines that the primary drawing instruction is to be executed first within the frame display unit time.

12. A vehicle equipped with a graphics display processing device that displays, in a single frame, a primary graphic requiring immediate display and a secondary graphic not requiring immediate display, wherein the graphics display processing device comprises:

a program storage that stores a primary drawing instruction specifying drawing of the primary graphic and a secondary drawing instruction specifying drawing of the secondary graphic;

a graphics processor that performs drawing processing by executing graphics instructions generated based on each drawing instruction;

an acquirer that acquires the primary drawing instruction and the secondary drawing instruction from the program storage;

an estimator that calculates an estimated graphics processing time required for the drawing processing by the graphics processor due to execution of the graphics instructions generated based on the secondary drawing instruction;

a determiner that determines, by using the estimated graphics processing time, which of the primary drawing instruction and the secondary drawing instruction is to be executed first;

an issuance controller that performs a control when the determiner determines that the primary drawing instruction is to be executed first, causing the primary drawing instruction to be issued and issuance of the secondary drawing instruction to be postponed;

an instruction issuer that issues each drawing instruction according to the control of the issuance controller; and an instruction executor that generates the graphics instructions by executing each drawing instruction issued, and before graphics instructions based on the secondary drawing instruction are executed and within a single frame display unit time in which the graphics instructions are to be executed, execution is completed of graphics instructions generated based on a tertiary drawing instruction specifying a tertiary graphic not requiring immediate display, the determiner stores a cumulative graphics processing time required for execution of the graphics instructions based on the tertiary drawing instruction, calculates a total graphics processing time by summing the cumulative graphics processing time and the estimated graphics processing time, and compares the total graphics processing time and a limit value of an acceptable processing time for drawing processing due to graphics instructions of a graphic not requiring immediate display, and when the total graphics processing time exceeds the limit value, determines that the primary drawing instruction is to be executed first within the frame display unit time.

* * * * *